US012763660B2

(12) United States Patent
Kobayashi

(10) Patent No.: US 12,763,660 B2
(45) Date of Patent: Oct. 13, 2026

(54) SWITCHING CONTROL CIRCUIT AND POWER SUPPLY CIRCUIT

(71) Applicant: FUJI ELECTRIC CO., LTD., Kawasaki (JP)

(72) Inventor: Yoshinori Kobayashi, Matsumoto-city (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 150 days.

(21) Appl. No.: 18/932,327

(22) Filed: Oct. 30, 2024

(65) Prior Publication Data

US 2025/0202367 A1 Jun. 19, 2025

(30) Foreign Application Priority Data

Dec. 13, 2023 (JP) ................................ 2023-210554

(51) Int. Cl.
*H02M 1/00* (2006.01)
*H02M 1/36* (2007.01)
*H02M 3/00* (2006.01)
*H02M 3/335* (2006.01)

(52) U.S. Cl.
CPC ....... *H02M 1/0035* (2021.05); *H02M 1/0009* (2021.05); *H02M 1/0032* (2021.05); *H02M 1/36* (2013.01); *H02M 3/01* (2021.05); *H02M 3/33569* (2013.01); *H02M 3/33571* (2021.05)

(58) Field of Classification Search
CPC ............ H02M 1/0009; H02M 1/0032; H02M 1/0035; H02M 1/36; H02M 3/33571; H02M 3/33569
See application file for complete search history.

(56) References Cited

U.S. PATENT DOCUMENTS

2011/0085354 A1* 4/2011 Wang .................... H02M 1/007 363/21.02
2016/0065075 A1* 3/2016 Sugahara ............ H02M 3/3376 363/21.02
2017/0237356 A1* 8/2017 Chen ................ H02M 3/33553 363/21.02
2017/0373604 A1 12/2017 Chen
(Continued)

FOREIGN PATENT DOCUMENTS

JP 2014-217144 A 11/2014
JP 2017-229209 A 12/2017
WO 2020/017163 A1 1/2020

*Primary Examiner* — Gary L Laxton
(74) *Attorney, Agent, or Firm* — Rabin & Berdo, P.C.

(57) ABSTRACT

A switching control circuit for controlling switching of first and second transistors of a power supply circuit. The switching control circuit including: a load detection circuit detecting a state of a load; a drive signal output circuit outputting a drive signal that causes the power supply circuit to operate in a burst mode and a normal mode respectively when the load is light and heavy loads. The drive signal output circuit operates in a first state in which the drive signal is outputted based on a predetermined condition, a second state in which the drive signal is outputted to gradually reduce an ON period of the first and second transistors and a third state in which outputting of the drive signal is stopped, and enters the third state from the first state without going through the second state immediately after the power supply circuit starts operating in the burst mode.

11 Claims, 16 Drawing Sheets

(56) References Cited

U.S. PATENT DOCUMENTS

| | | | | |
|---|---|---|---|---|
| 2023/0051610 | A1* | 2/2023 | Matsumoto ......... | H02M 1/4225 |
| 2023/0253871 | A1* | 8/2023 | Sugawara ........... | H02M 1/0032 |
| | | | | 363/21.02 |

* cited by examiner

| | | |
|---|---|---|
| ho | ON | AFTER DEAD TIME Td HAS ELAPSED SINCE DRIVE SIGNAL lo GOES LOW |
| | OFF | AFTER TIME Tah HAS ELAPSED SINCE RESONANT CURRENT Icr REACHES ZERO |
| lo | ON | AFTER DEAD TIME Td HAS ELAPSED SINCE DRIVE SIGNAL ho GOES LOW |
| | OFF | AFTER TIME Tal HAS ELAPSED SINCE RESONANT CURRENT Icr REACHES ZERO |
| Tbh | | TIME PERIOD FROM WHEN DRIVE SIGNAL lo GOES LOW TO WHEN RESONANT CURRENT Icr REACHES ZERO |
| Tah | | CALCULATE BASED ON TIME Tbh AND FEEDBACK VOLTAGE Vfb |
| Tbl | | TIME PERIOD FROM WHEN DRIVE SIGNAL ho GOES LOW TO WHEN RESONANT CURRENT Icr REACHES ZERO |
| Tal | | CALCULATE BASED ON TIME Tbl AND FEEDBACK VOLTAGE Vfb |

FIG. 6

| | DRIVE SIGNAL ho | DRIVE SIGNAL lo |
|---|---|---|
| ON | AFTER DEAD TIME Td HAS ELAPSED SINCE DRIVE SIGNAL lo GOES LOW | AFTER DEAD TIME Td HAS ELAPSED SINCE DRIVE SIGNAL ho GOES LOW |
| OFF | AFTER VOLTAGE Vvw DROPS BELOW THRESHOLD VALUE Thvw_h | AFTER VOLTAGE Vvw RISES ABOVE THRESHOLD VALUE Thvw_l |

FIG. 11

SWITCHING CONTROL CIRCUIT AND POWER SUPPLY CIRCUIT

CROSS-REFERENCE TO RELATED APPLICATIONS

The present application claims priority pursuant to 35 U.S.C. § 119 from Japanese patent application number 2023-210554, filed on Dec. 13, 2023, the entire disclosure of which is hereby incorporated by reference herein.

BACKGROUND

Technical Field

The present disclosure relates to a switching control circuit and a power supply circuit.

Current-resonant DC-DC converters each typically operate in an operating mode (normal mode) of continuously driving a switching device when a load is in a heavy load state, and transitions to a burst mode when the load enters a light load state. When operating in the burst mode, such a DC-DC converter may perform so-called soft start and soft end to prevent a transformer included in the DC-DC converter from making noise (for example, International Publication No. WO2020/17163, Japanese Patent Application Publication No. 2017-229209, and Japanese Patent Application Publication No. 2014-217144).

However, when the DC-DC converter shifts to the burst mode and performs a soft end operation, the output voltage may reach an overvoltage depending on the state of the load.

The present disclosure is directed to provision of a switching control circuit capable of restraining an output voltage from reaching an overvoltage when shifting from a normal mode to a burst mode.

SUMMARY

A first aspect of the present disclosure is a switching control circuit for a power supply circuit that generates an output voltage of a target level from an input voltage thereof, the power supply circuit including a transformer including a primary coil, a secondary coil, and an auxiliary coil, a first transistor and a second transistor configured to control a current of the primary coil, and a first capacitor that forms a resonant circuit with the primary coil, the switching control circuit being configured to control switching of the first transistor and the second transistor, the switching control circuit comprising: a load detection circuit configured to detect a state of a load of the power supply circuit, based on a resonant current flowing through the resonant circuit; and a drive signal output circuit configured to output a drive signal, which causes the power supply circuit to operate in a burst mode when the load is in a light-load state, and causes the power supply circuit to operate in a normal mode when the load is in a heavy-load state, wherein the drive signal output circuit is configured to operate in: a first state, in which the drive signal is outputted based on a predetermined condition, a second state, in which the drive signal is outputted to gradually reduce an ON period of the first transistor and the second transistor, and a third state, in which an output of the drive signal is stopped; and the drive signal output circuit is further configured to enter the third state from the first state without going through the second state, immediately after the power supply circuit starts operating in the burst mode.

A second aspect of the present disclosure is a power supply circuit configured to generate an output voltage of a target level from an input voltage thereof, the power supply circuit comprising: a transformer including a primary coil, a secondary coil, and an auxiliary coil; a first transistor and a second transistor configured to control a current flowing through the primary coil; a first capacitor that forms a resonant circuit with the primary coil; and a switching control circuit configured to control switching of the first transistor and the second transistor, the switching control circuit including: a load detection circuit configured to detect a state of a load of the power supply circuit, based on a resonant current flowing through the resonant circuit; and a drive signal output circuit configured to output a drive signal, which causes the power supply circuit to operate in a burst mode when the load is in a light-load state, and causes the power supply circuit to operate in a normal mode when the load is in a heavy-load state, wherein the drive signal output circuit is configured to operate in: a first state, in which the drive signal is outputted based on a predetermined condition, a second state, in which the drive signal is outputted to gradually reduce an ON period of the first transistor and the second transistor, and a third state, in which an output of the drive signal is stopped; and the drive signal output circuit is further configured to enter the third state from the first state, without going through the second state, immediately after the power supply circuit starts operating in the burst mode.

A third aspect of the present disclosure is a switching control circuit for a power supply circuit that generates an output voltage of a target level from an input voltage thereof, the power supply circuit including a transformer including a primary coil, a secondary coil, and an auxiliary coil, a first transistor and a second transistor configured to control a current flowing through the primary coil, and a first capacitor that forms a resonant circuit with the primary coil, the switching control circuit being configured to control switching of the first transistor and the second transistor, the switching control circuit comprising: a drive signal output circuit configured to output a plurality of types of drive signals to drive the first transistor and the second transistor, the plurality of types of drive signals including: a first drive signal outputted based on a resonant current of the resonant circuit and a feedback voltage corresponding to the output voltage, a second drive signal outputted based on a dead time and a timing at which a voltage at the auxiliary coil reaches any of a plurality of predetermined levels, a third drive signal outputted so as to gradually reduce an ON period of the first transistor and the second transistor, and a fourth signal outputted so as to stop driving of the first transistor and the second transistor, wherein the drive signal output circuit is configured to operate in a first pattern of outputting the first drive signal, then the second drive signal, and then the fourth drive signal, without outputting the third drive signal, and thereafter operate in a second pattern of outputting in an order of the second drive signal, the third drive signal, and the fourth drive signal.

BRIEF DESCRIPTION OF THE DRAWINGS

FIG. 6 is a diagram summarizing a drive system in a "normal mode".

FIG. 11 is a diagram summarizing a drive system in a "state 1".

DETAILED DESCRIPTION

At least following matters will become apparent from the descriptions of the present description and the accompanying drawings.

Embodiment(s)

<<<Overview of Switching Power Supply Circuit 10>>>

Figure 1:
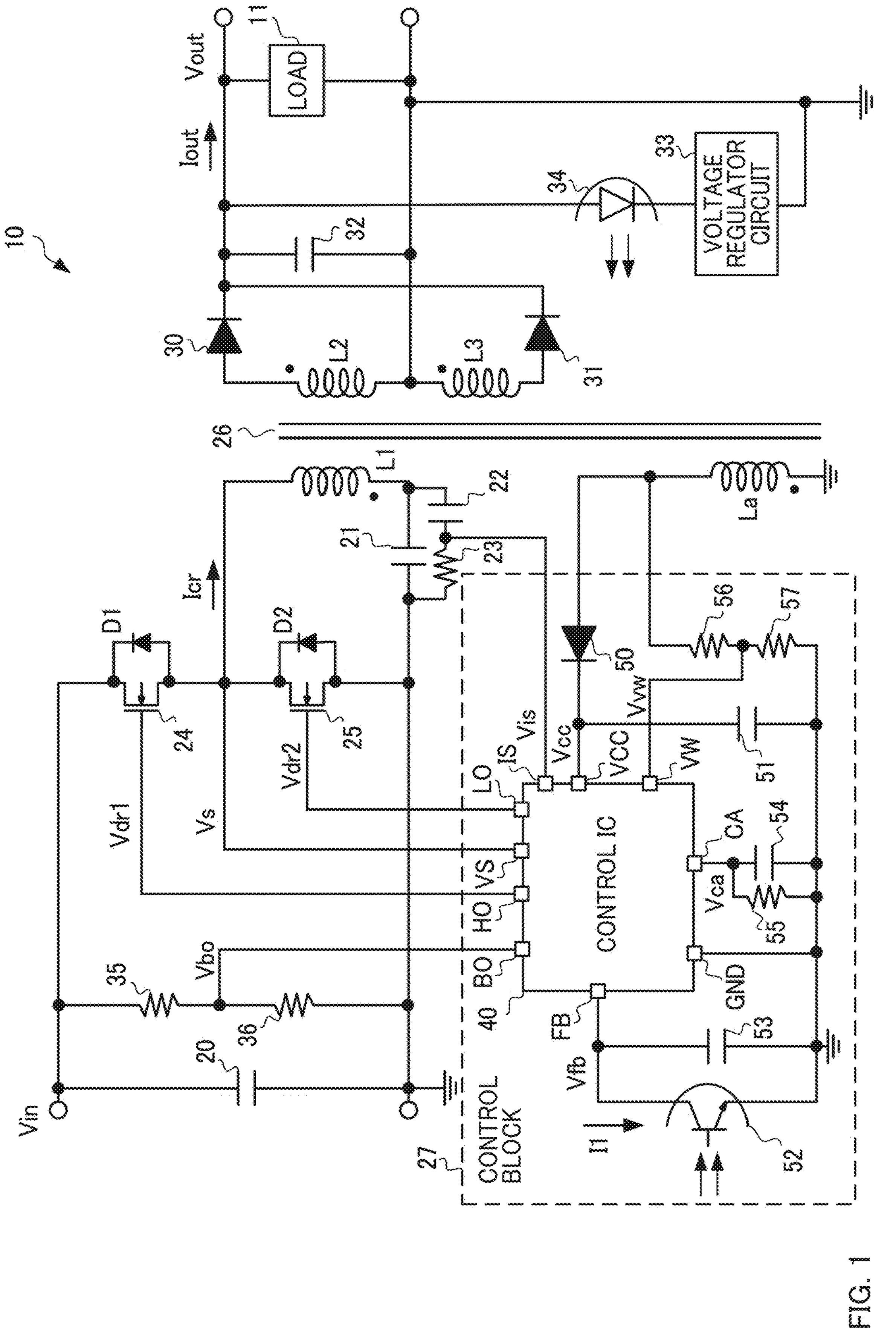
FIG. 1 is a diagram illustrating a configuration example of a switching power supply circuit 10.

FIG. 1 is a diagram illustrating an example configuration of a switching power supply circuit 10, which is an embodiment of the present disclosure. The switching power supply circuit 10 is an LLC current resonant power supply circuit that generates, at a load 11, an output voltage Vout at a target level from a predetermined input voltage Vin.

The switching power supply circuit 10 includes capacitors 20, 21, 22, and 32, a resistor 23, N-channel metal-oxide-semiconductor (NMOS) transistors 24, 25, a transformer 26, a control block 27, diodes 30 and 31, a voltage regulator circuit 33, a light-emitting diode 34, and resistors 35 and 36.

The capacitor 20 stabilizes a voltage between a power supply line that receives the input voltage Vin and a ground line on a ground side, to thereby remove noise and the like. The input voltage Vin is a direct-current (DC) voltage at a predetermined level. The capacitor 21 is a so-called resonant capacitor configuring a resonant circuit with a leakage inductance between a primary coil L1 and secondary coils L2 and L3. Note that the capacitor 21 corresponds to a "first capacitor".

The capacitor 22 and the resistor 23 configure a detection circuit that shunts and detects a resonant current Icr flowing through the capacitor 21. The capacitor 22 and the resistor 23, which are connected in series, are connected in parallel with the capacitor 21.

The resistor 23 generates a voltage Vis, based on the current obtained by shunting the resonant current Icr. Accordingly, the voltage Vis results in a voltage corresponding to the resonant current Icr. Note that the resonant current Icr when flowing in the direction given in FIG. 1 is referred to as positive resonant current Icr, and it is assumed that the voltage Vis in this case is a positive voltage. When the resonant current Icr flows in the direction of the arrow, in other words, when the resonant current Icr flows in the order of the primary coil L1, the capacitor 22, and the resistor 23, the direction of the resonant current Icr is positive. Meanwhile, when the resonant current Icr flows in the direction opposite to the direction of the arrow, in other words, when the resonant current Icr flows in the order of the resistor 23, the capacitor 22, and the primary coil L1, the direction of the resonant current Icr is negative.

The NMOS transistor 24 is a high-side power transistor, and the NMOS transistor 25 is a low-side power transistor. Specifically, the NMOS transistors 24, 25 are connected in series between a node that receives the input voltage Vin and a node that receives a ground voltage. In an embodiment of the present disclosure, the NMOS transistors 24, 25 are used as switching devices, however, for example, P-channel metal-oxide-semiconductor (PMOS) transistors or bipolar transistors may be used. The NMOS transistor 24 corresponds to a "first transistor", and the NMOS transistor 25 corresponds to a "second transistor".

The transformer 26 includes the primary coil L1, the secondary coils L2 and L3, and an auxiliary coil La. The primary coil L1, the secondary coils L2 and L3, and the auxiliary coil La are insulated from one another. In the transformer 26, voltages are generated at the secondary coils L2, L3 on the secondary side and the auxiliary coil La, according to variation in the voltage at the primary coil L1 on the primary side.

The primary coil L1 has one end to which the source of the NMOS transistor 24 and the drain of the NMOS transistor 25 are connected, and the other end to which the source of the NMOS transistor 25 is connected through the capacitor 21.

Accordingly, upon start of switching of the NMOS transistors 24, 25, the respective voltages at the secondary coils L2 and L3 and the auxiliary coil La vary. Note that the primary coil L1 and the secondary coils L2 and L3 are electromagnetically connected with different polarities, and the primary coil L1 and the auxiliary coil La are electromagnetically connected with the same polarity.

The control block 27 is a circuit block that controls switching of the NMOS transistors 24, 25, which will be described later in detail.

The diodes 30 and 31 rectify the voltages at the secondary coils L2 and L3, and the capacitor 32 smooths the rectified voltages. As a result, the output voltage Vout having been smoothed is generated at the capacitor 32. Note that the output voltage Vout results in a direct-current voltage at the target level.

The voltage regulator circuit 33 generates a constant DC voltage, and is configured using a shunt regulator, for example.

The light emitting diode 34 is an element that emits light with an intensity corresponding to a difference between the output voltage Vout and an output of the voltage regulator circui56*t* 33, configures a photocoupler with and a phototransistor 52, which will be described later. In an embodiment of the present disclosure, as the level of the output voltage Vout rises, the intensity of the light from the light emitting diode 34 increases.

Resistors 35 and 36 configure a voltage divider circuit that divides the input voltage Vin, and a voltage Vbo is generated at the connection node between the resistors 35 and 36.

<<<Control Block 27>>>

The control block 27 includes a control IC 40, a diode 50, capacitors 51, 53, and 54, a phototransistor 52, and resistors 55, 56, and 57. Note that the control IC 40 corresponds to a "switching control circuit".

The control IC 40 is an integrated circuit that controls switching of the NMOS transistors 24, 25, and has terminals VCC, GND, FB, IS, CA, HO, LO, VS, BO, and VW.

The terminal VCC is a terminal that receives a power supply voltage Vcc to operate the control IC 40. The cathode of the diode 50 and the capacitor 51 having one end that is grounded are connected to the terminal VCC. Then, the capacitor 51 is charged with the voltage from the auxiliary coil La of the transformer 26, resulting in the voltage Vcc. Note that the control IC 40 is activated upon application of the divided voltage of the input voltage Vin obtained by rectifying an alternating current (AC) input through a terminal (not illustrated), and after being activated, the control IC 40 operates based on the power supply voltage Vcc.

The terminal GND is a terminal that receives the ground voltage, and, for example, the housing of a device where the switching power supply circuit 10 is provided or the like is connected thereto.

The terminal FB is a terminal at which a feedback voltage Vfb corresponding to the output voltage Vout is generated, and to which the phototransistor 52 and the capacitor 53 are connected. The phototransistor 52 passes, from the terminal FB to the ground, a bias current I1 having a magnitude corresponding to the intensity of the light from the light-emitting diode 34, and the capacitor 53 is provided to remove noise between the terminal FB and the ground. Accordingly, the phototransistor 52 operates as a transistor that generates a sink current.

The terminal IS is a terminal that detects the current value of the resonant current of the primary coil L1. Here, the voltage corresponding to the current value of the resonant current of the primary coil L1 is generated at the node at which the capacitor 22 and the resistor 23 are connected. Thus, the voltage Vis corresponding to the current value of the resonant current of the primary coil L1 is applied to the terminal IS.

Terminal CA is a terminal that receives a voltage Vca, which is generated based on the resonant current of the primary coil L1 and corresponds to the input power of the switching power supply circuit 10. The capacitor 54 and the resistor 55 are connected to the terminal CA, which will be described later in detail.

The terminal HO is a terminal from which a driving voltage Vdr1 to drive the NMOS transistor 24 is outputted, and the gate of the NMOS transistor 24 is connected thereto.

The terminal LO is a terminal from which a driving voltage Vdr2 to drive the NMOS transistor 25 is outputted, and the gate of the NMOS transistor 25 is connected thereto.

The terminal VS is a terminal that receives a voltage at the connection node at which the source terminal of the NMOS transistor 24 and the drain terminal of the NMOS transistor 25 are connected. Upon turning on of the NMOS transistor 24, the input voltage Vin is applied thereto, and upon turning on of the NMOS transistor 25, the ground voltage is applied thereto.

The potential of a voltage Vs at the terminal VS is the reference potential of the output voltage of a bootstrap circuit (not illustrated) to turn on the NMOS transistor 24 when the input voltage Vin is being applied to the terminal VS.

The terminal BO is a terminal that receives the voltage Vbo generated by the resistors 35 and 36.

The terminal VW is a terminal that receives a voltage Vvw obtained by dividing the voltage at the auxiliary coil La by the resistors 56 and 57.

<<<Details of Control IC 40>>>

Figure 2:
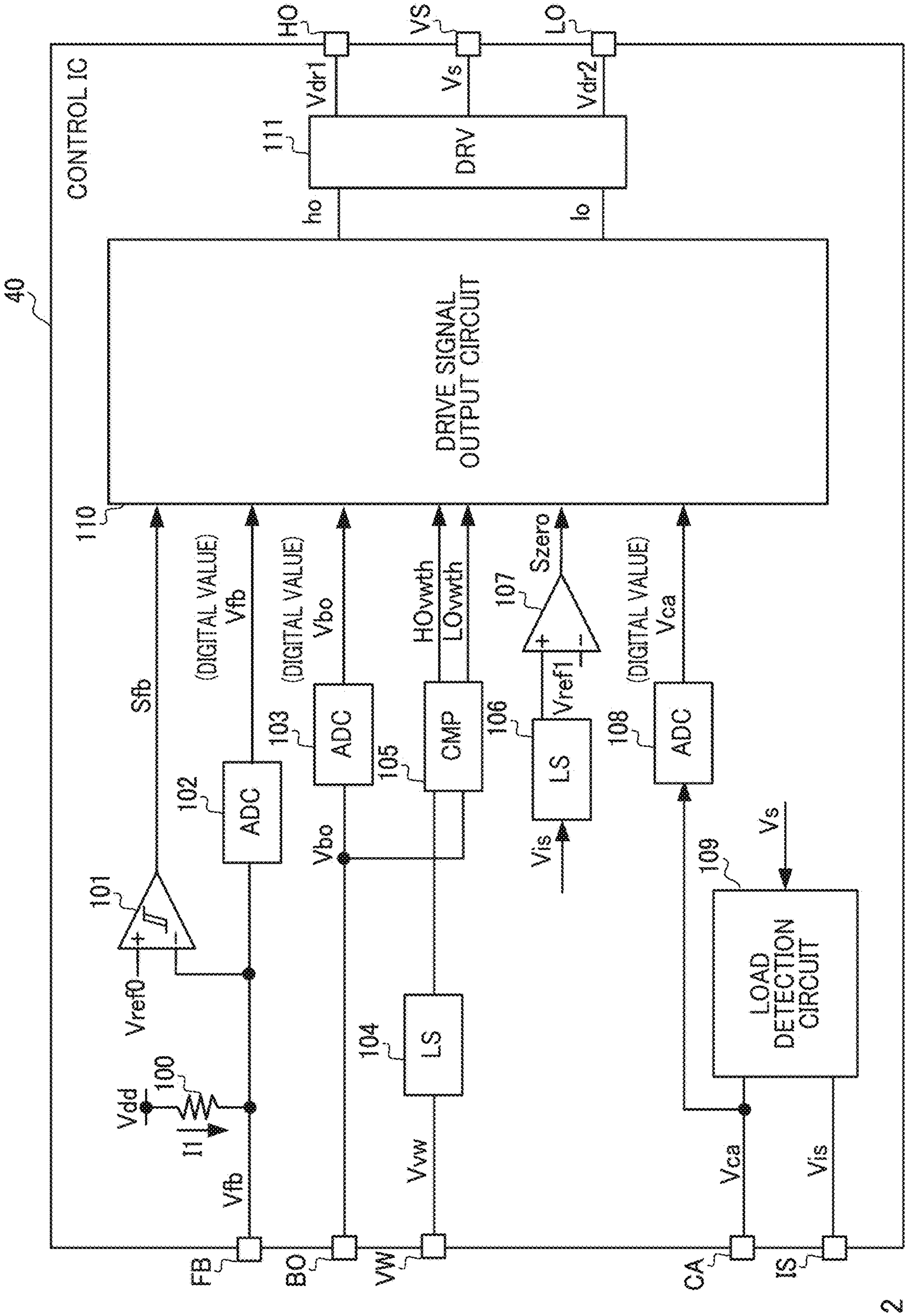
FIG. 2 is a diagram illustrating a configuration example of a control IC 40.

FIG. 2 is a diagram illustrating an example of the control IC 40. The control IC 40 is an integrated circuit that drives the NMOS transistors 24, 25, based on the state that transitions according to the voltages applied to the terminals. The control IC 40 includes a resistor 100, a hysteresis comparator 101, analog-to-digital converter circuits (ADC) 102, 103, and 108, level shifter circuits (LS) 104 and 106, a comparator circuit (CMP) 105, a comparator 107, a load detection circuit 109, a drive signal output circuit 110, and a driver circuit (DRV) 111. Note that the terminals VCC and GND are omitted here for convenience.

The resistor 100 generates the feedback voltage Vfb, based on the bias current I1 from the phototransistor 52. Note that the resistor 100 has one end that receives a predetermined voltage Vdd, and the other end connected to the terminal FB. Accordingly, the feedback voltage Vfb generated at the terminal FB is expressed by Formula (1):

$$Vfb = Vdd - R \times I1 \quad (1),$$

where "R" is a resistance value of the resistor 100.

As described above, in an embodiment of the present disclosure, the current value of the bias current I1 increases with a rise in the output voltage Vout. Accordingly, in response to the output voltage Vout rising, the feedback voltage Vfb drops.

The hysteresis comparator 101 is used when operating in an operation mode in which the NMOS transistors 24, 25 are driven intermittently (i.e., a "burst mode"), to thereby detect whether the feedback voltage Vfb is high or not. The hysteresis comparator 101 compares the reference voltage Vref0_*h*, which is generated from the reference voltage Vref0, and the reference voltage Vref_l, which is lower than the reference voltage Vref0_*h*, with the feedback voltage Vfb.

Specifically, the hysteresis comparator 101 outputs a signal Sfb at high level (hereinafter referred to as high or high level), in response to the output voltage Vout dropping and the feedback voltage Vfb exceeding the reference voltage Vref0_*h*. Meanwhile, the hysteresis comparator 101 outputs a signal Sfb at a low level (hereinafter referred to as low or low level), in response to the output voltage Vout rising and the feedback voltage Vfb dropping below the reference voltage Vref0_*l*.

The analog-to-digital convertor circuit (ADC) 102 converts the feedback voltage Vfb at the terminal FB into a digital value to be outputted. The feedback voltage Vfb converted into a digital value is used for the drive signal output circuit 110 (described later) to output drive signals ho, lo (described later) at least in an operation mode in which the NMOS transistor 24, 25 is driven continuously (i.e., "normal mode").

The analog-to-digital converter circuit (ADC) 103 converts the voltage Vbo at the terminal BO into a digital value to be outputted. The voltage Vbo converted into a digital value is used at least for the drive signal output circuit 110 (described later) to output the drive signals ho, lo (described later) in so-called soft start and soft end.

The level shifter circuit (LS) 104 shifts the level of the voltage Vvw.

The comparator circuit (CMP) 105 compares the magnitude between the level-shifted voltage Vvw with threshold values Thvw_h and Thyw_l according to the voltage Vbo, to thereby output pulse signals LOvwth and HOvwth. Specifically, the comparator circuit 105 outputs the pulse signal HOvwth to turn off the NMOS transistor 24, in response to the level-shifted voltage Vvw dropping below the threshold value Thvw_h. Meanwhile, the comparator circuit 105 outputs the pulse signal LOvwth to turn off the NMOS transistor 25, in response to the level-shifted voltage Vvw exceeding the threshold value Thvw_l. Note that the pulse signals HOvwth, LOvwth correspond to a "comparison result".

The level shifter circuit (LS) 106 shifts the level of the voltage Vis.

The comparator 107 detects the polarity of the resonant current Icr by comparing the level-shifted voltage Vis with the reference voltage Vref1, to thereby output a signal Szero. Note that the reference voltage Vref1 is equal to the voltage obtained by shifting the level of the voltage Vis at the time when the resonant current Icr reaches zero. Further, the comparator 107 detects the timing at which the resonant current Icr reaches zero, and the timing at which the logic level of the signal Szero changes is the same as the timing at which the resonant current Icr reaches zero. Note that the comparator 107 corresponds to a "detection circuit", and the signal Szero corresponds to a "detection result".

The analog-to-digital converter circuit (ADC) 108 converts the voltage Vca at the terminal CA into a digital value to be outputted. The voltage Vca converted into a digital value is used for the drive signal output circuit 110 (described later) to switch the mode between the "normal mode" and the "burst mode.

The load detection circuit 109 detects whether the load 11 is in a light load state or a heavy load state, based on the voltage that is applied to the terminal IS and that corresponds to the power consumption of the load 11 (in other words, the voltage Vis corresponding to the resonant current flowing through the resonant circuit). Here, the power consumption of the load 11 is larger when the load 11 is in the heavy load state than when the load 11 is in the light load state. Accordingly, the voltage Vis applied to the terminal IS indicates the voltage corresponding to the power consumption of the load 11, and thus when the voltage Vis is lower than a predetermined value, the load detection circuit 109 outputs the voltage Vca indicating that the load 11 is in the light load state.

Meanwhile, when the voltage Vis is higher than the predetermined value, the load detection circuit 109 outputs the voltage Vca indicating that the load 11 is in the heavy load state. Note that the heavier the state of the load 11 becomes, the higher the voltage Vca rises.

Note that the phrase "the load 11 is in the heavy load state" indicates the case in which the current value of the load current Iout flowing through the load 11 is equal to or larger than a predetermined value (e.g., 1 A), for example. Further, "the load 11 is in the light load" indicates the case in which the current value of the load current Iout flowing through the load 11 is smaller than the predetermined value (e.g., 1 A), for example. Furthermore, the phrase "the load 11 is in no load state" indicates the case in which the current value of the load current Iout flowing through the load 11 is extremely small or 0 (zero) A. Although it is described that the current value of the load current Iout to determine whether the load 11 is in the heavy load state or the light load state is 1 A, for example, however, this current value may be set to various values.

The drive signal output circuit 110 outputs the drive signals ho, lo, based on multiple signals, such as the signal Sfb, and digital values. Specifically, the drive signal output circuit 110 outputs the drive signals ho, lo to operate the switching power supply circuit 10 in the "burst mode", when the load 11 is in the light load, as will be described later in detail. Meanwhile, the drive signal output circuit 110 outputs the drive signals ho, lo to operate the switching power supply circuit 10 in the "normal mode", when the load 11 is in the heavy load state.

The driver circuit (DRV) 111 outputs the driving voltages Vdr1 and Vdr2 to drive the NMOS transistors 24, 25 in FIG. 1, respectively. Specifically, in response to the drive signal output circuit 110 outputting the high drive signal ho, the driver circuit 111 outputs the driving voltage Vdr1 to turn on the NMOS transistor 24. In response to the drive signal output circuit 110 outputting the low drive signal ho, the driver circuit 111 outputs the driving voltage Vdr1 to turn off the NMOS transistor 24. Further, in response to the drive signal output circuit 110 outputting the high drive signal lo, the driver circuit 111 outputs the driving voltage Vdr2 to turn on the NMOS transistor 25. In response to the drive signal output circuit 110 outputting the low drive signal lo, the driver circuit 111 outputs the driving voltage Vdr2 to turn off the NMOS transistor 25.

===State Transitions of Drive Signal Output Circuit 110===

Figure 3:
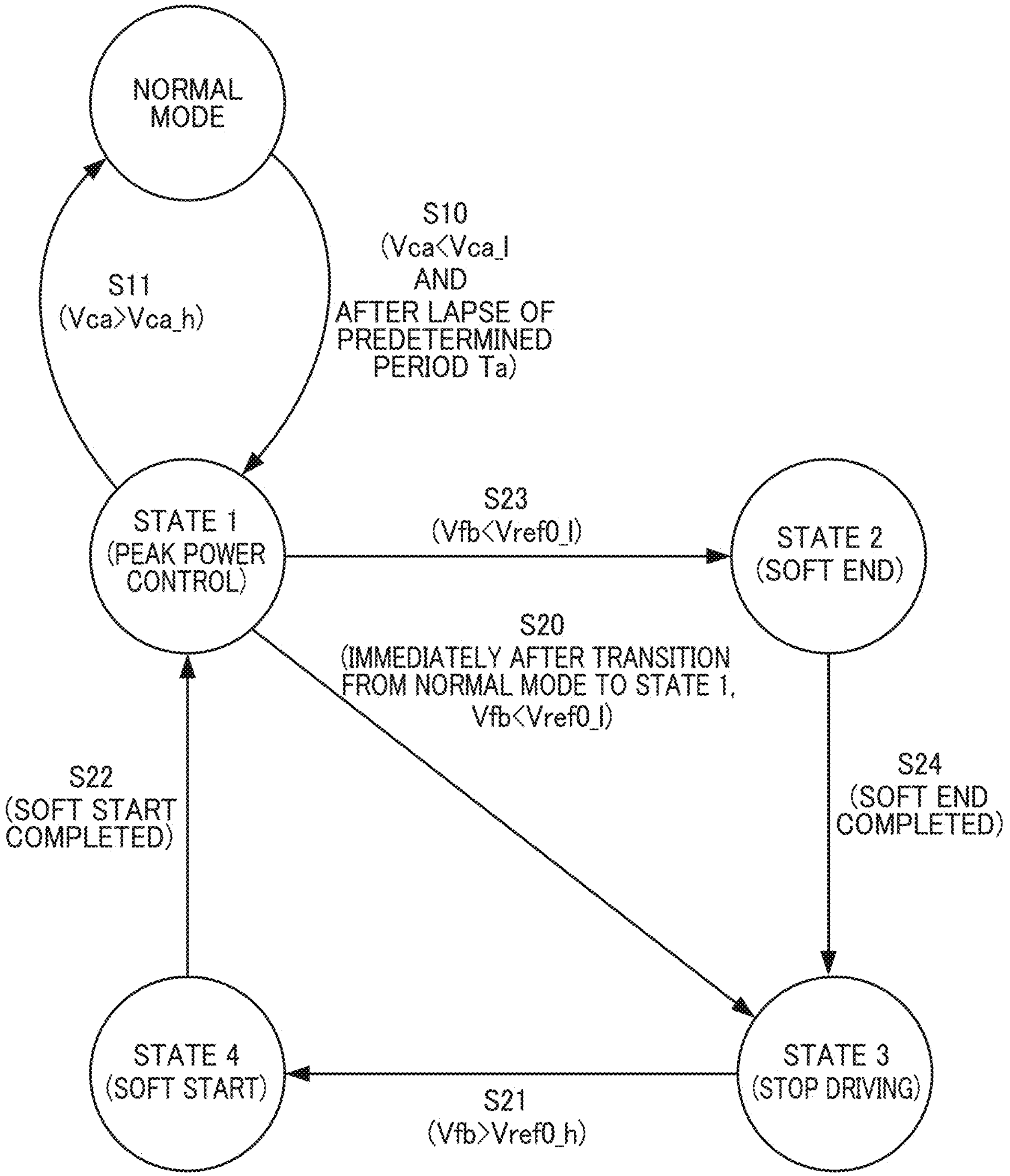
FIG. 3 is a diagram illustrating state transitions of a drive signal output circuit 110.

FIG. 3 illustrates the state transitions of the drive signal output circuit 110. Note that FIG. 3 illustrates how the state of the drive signal output circuit 110 transitions, and thus how the drive signal output circuit 110 outputs the drive signals ho, lo in each state will be described later. Further, a "state 1" to a "state 4" indicate the states of the drive signal output circuit 110 when the switching power supply circuit 10 operates in the "burst mode". First, it is assumed that the control IC 40 operates the switching power supply circuit 10 in the "normal mode".

In the "normal mode," when the load 11 enters the light load state; the voltage Vca drops below the threshold value Vca_l; and a predetermined period Ta has elapsed, the state of the drive signal output circuit 110 changes from the "normal mode" to the "state 1", which is a state in the "burst mode" (process S10).

The "state 1" is a state in which the drive signal output circuit 110 outputs the drive signals ho, lo, based on the voltage Vvw (i.e., peak power control is performed), which will be described later in detail. Further, immediately after the operation of the switching power supply circuit 10 is shifted from the "normal mode" to the "burst mode", the state of the drive signal output circuit 110 changes from the "state 1" to the "state 3" (described later) without going through the "state 2" (described later).

Meanwhile, when the switching power supply circuit 10 operates in the "burst mode" except immediately after the switching power supply circuit 10 starts operating in the "burst mode," the state of the drive signal output circuit 110 repeatedly changes from the "state 3", through the "state 4" (described later) and the "state 1", to the "state 2.

As such, with the state transition path of from the "state 1" to the "state 4" being made different between the path immediately after the transition from the "normal mode" to the "state 1" and the path in cases other than that, the output voltage Vout can be restrained from reaching an overvoltage during a time period before the drive signal output circuit 110 enters the "state 3".

Returning to FIG. 3, in the "state 1", immediately after the transition from the "normal mode", the load 11 enters the light load state, and in response to the output voltage Vout rising and the feedback voltage Vfb dropping below the reference voltage Vref0_*l*, the state of the drive signal output circuit 110 changes from the "state 1" to the "state 3" without going through the "state 2" (describe later) (process S20).

The "state 3" is a state in which the driving of the NMOS transistors 24, 25 in FIG. 1 is stopped. Then, in the "state 3", the load 11 enters the heavy load state, and in response to the output voltage Vout dropping and the feedback voltage Vfb exceeding the reference voltage Vref0_*h*, which is higher than the reference voltage Vref0_*l*, the state of the drive signal output circuit 110 changes from the "state 3" to the "state 4" (process S21). In an embodiment of the present disclosure, in order to suppress the rise in the output voltage Vout, the state of the switching output circuit 110 changes from the "state 1" to the "state 3" immediately after the operation of the switching power supply circuit 10 is shifted to the "burst mode", and a soft-end operation is not performed, which will be described later in detail.

The "state 4" is a state in which the drive signals ho, lo to gradually increase ON period of NMOS transistors 24, 25 are outputted (so-called soft-start operation is performed). Then, in response to the soft-start period being completed in the "state 4", the state of the drive signal output circuit 110 changes from the "state 4" to the "state 1" (process S22).

The operation immediately after the transition from the "normal mode" to the "burst mode" has been described. Meanwhile, the switching power supply circuit 10 enters the "state 3" immediately after starting the operation in the "burst mode", and thereafter the state of the drive signal output circuit 110 repeats from the "state 1" to the "state 4" in order to drive the NMOS transistors 24, 25 intermittently.

When the drive signal output circuit 110 is in the "state 1" in a time period except immediately after the transition to the "burst mode," the state of the drive signal output circuit 110 changes from the "state 1" to the "state 2" in response to the output voltage Vout rising and the feedback voltage Vfb dropping below the reference voltage Vref0_*l* (process S23).

The "state 2" is a state in which the drive signals ho, lo to gradually reduce the ON period of NMOS transistors 24, 25 are outputted (so-called soft-end operation is performed). Then, in response to the soft end period being completed in the "state 2", the drive signal output circuit 110 changes from the "state 2" to the "state 3" (process S24).

As such, when the switching power supply circuit 10 is continuously operated in the "burst mode," the drive signal output circuit 110 repeats changes from the "state 3", through the "state 4" and the "state 1," to the "state 2. This suppresses the noise in the transformer 26 in FIG. 1 when the NMOS transistors 24, 25 of FIG. 1 are driven in the "burst mode".

Further, in the "state 1", in response to the load 11 entering the heavy load state and the voltage Vca exceeding the threshold value Vca_h, the state of the drive signal output circuit 110 changes from the "state 1" in the "burst mode" to the "normal mode" such that the switching power supply circuit 10 is operated in the "normal mode" (process S11). Note that the "state 1" corresponds to a "first state", the "state 2" corresponds to a "second state", the "state 3" corresponds to a "third state 3", and the "state 4" corresponds to a "fourth state".

===Output System of Drive Signals ho, lo in "Normal Mode"===

Figure 4:
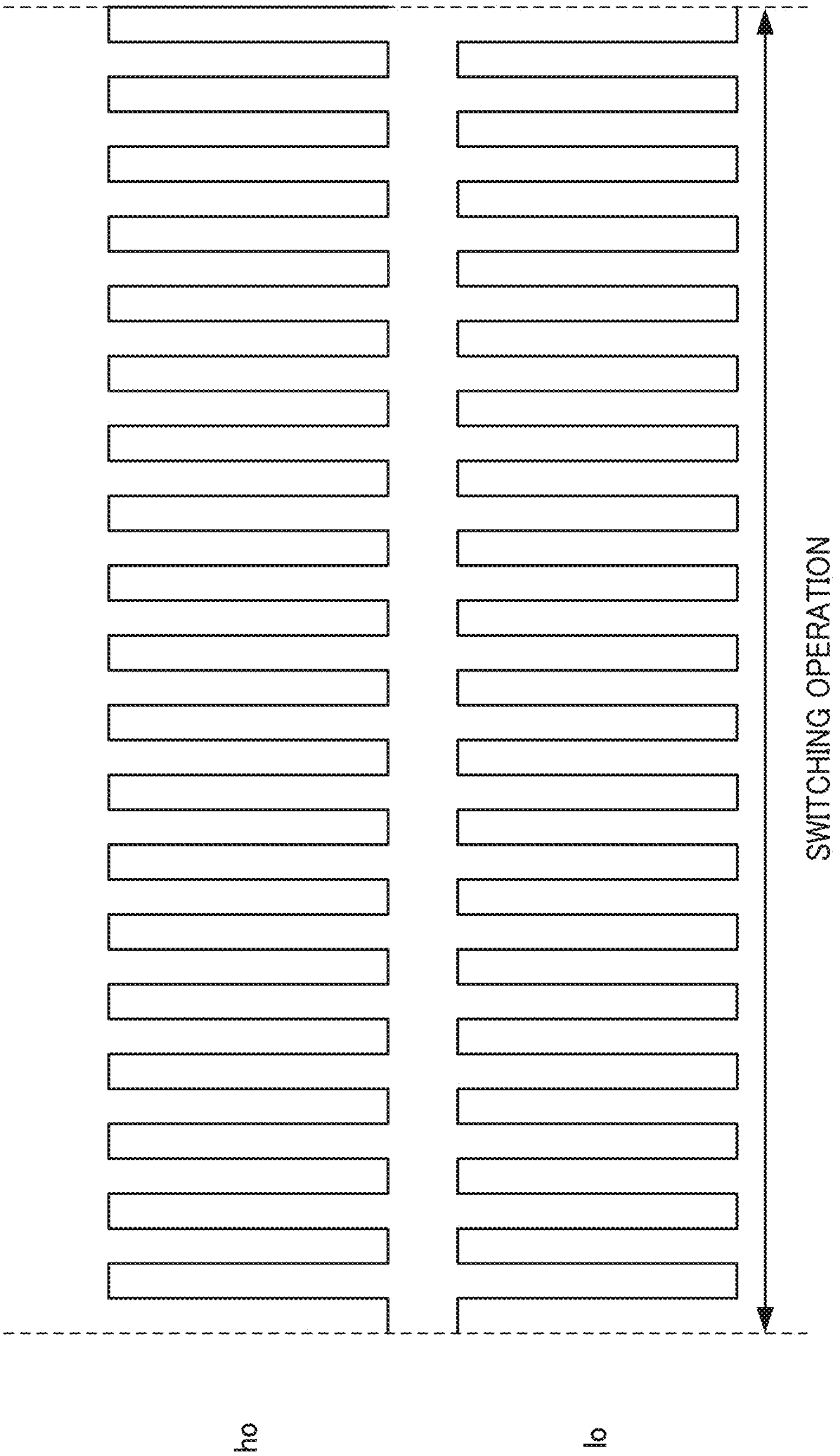
FIG. 4 is a diagram illustrating a drive pattern in a "normal mode".

FIG. 4 is diagram illustrating a drive pattern in the "normal mode. When the switching power supply circuit 10 is operated in the "normal mode", the drive signal output circuit 110 outputs the drive signals ho, lo to drive the NMOS transistors 24, 25 continuously, without intermittently stopping the switching operation, as illustrated in FIG. 4.

===Drive System in "Normal Mode"===

Figure 5:
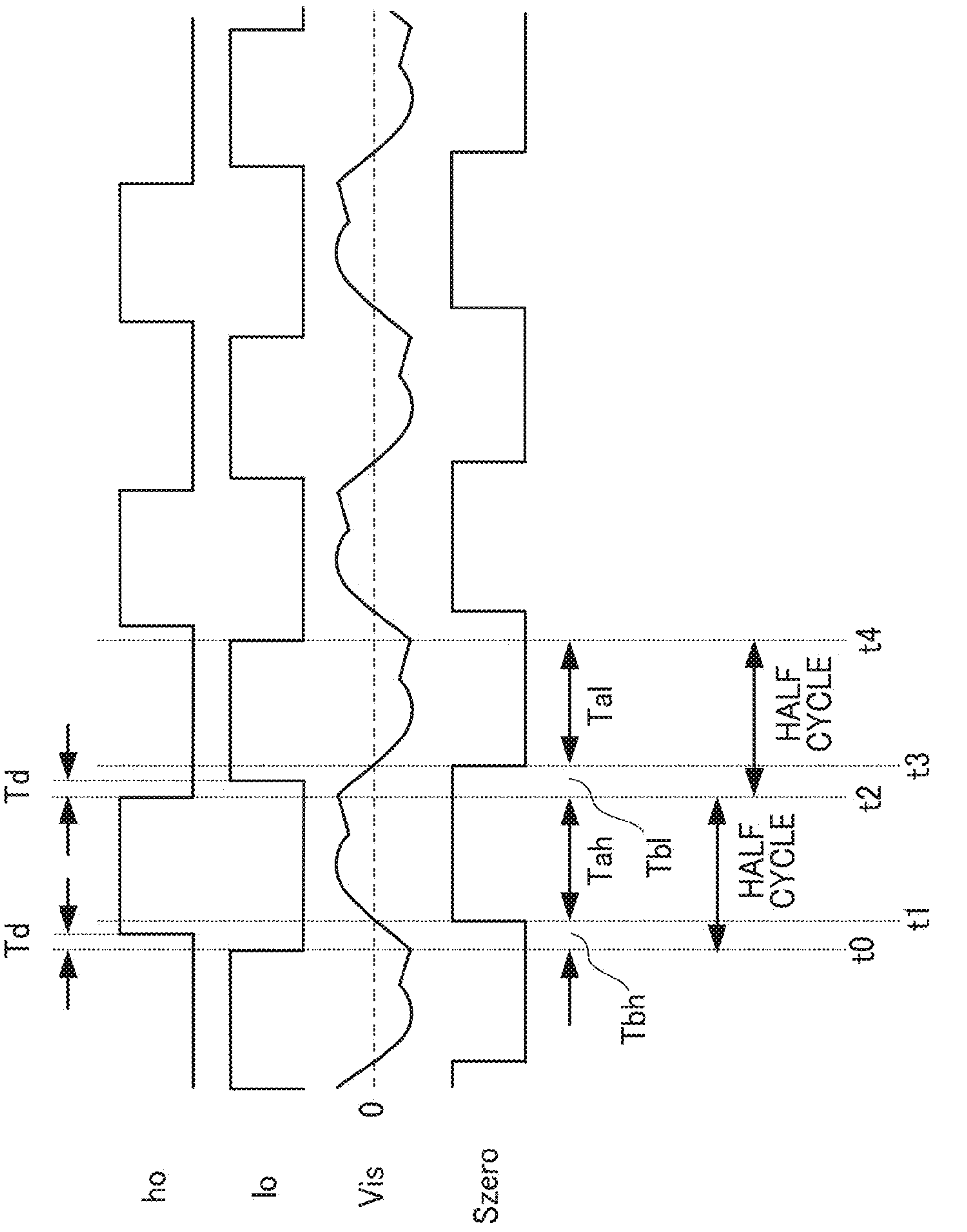
FIG. 5 is a diagram illustrating a drive system in a "normal mode".

FIG. 5 is a diagram illustrating the drive system in the "normal mode". When the switching power supply circuit 10 is operated in the "normal mode", the drive signal output circuit 110 outputs the drive signals ho, lo by a drive system that is so-called phase ratio control. Note that "phase ratio control" refers to the drive system to control the switching of the NMOS transistors 24, 25, based on the direction (i.e., polarity) of the resonant current Icr and the feedback voltage Vfb.

The following describes a specific drive system of the phase ratio control with reference to FIG. 5. In FIG. 5, the drive signal output circuit 110 outputs a high drive signal ho after the dead time Td has elapsed since a low drive signal lo is outputted, as illustrated in FIG. 6. Similarly, the drive signal output circuit 110 outputs a high drive signal lo after the dead time Td has elapsed since a low drive signal ho is outputted, as illustrated in FIG. 6. Note that "the dead time" refers to the time period during which both the NMOS transistors 24, 25 are off so that through current does not flow between the node that receives the input voltage Vin and the node that receives the ground voltage with the NMOS transistors 24, 25 being turned on simultaneously.

At time to, the drive signal output circuit 110 outputs the low drive signal lo. Then, the drive signal output circuit 110 starts measuring a time period Tbh from time to. Further, the drive signal output circuit 110 obtains the feedback voltage Vfb at time to. Note that time to indicates the start of a half cycle.

At time t1, the resonant current Icr reaches zero, and the comparator 107 in FIG. 2 outputs the high signal Szero. In this event, the drive signal output circuit 110 finishes measuring the time period Tbh, and calculates the time period Tah until the end of the half cycle, based on the previously obtained the feedback voltage Vfb and the time period Tbh.

At time t2 at which the time period Tah has elapsed since time t1, the drive signal output circuit 110 outputs the low drive signal ho, as illustrated in FIG. 6. Then, the drive signal output circuit 110 starts measuring the time period Tbl from time t2, and also obtains the feedback voltage Vfb at time t2. Note that time t2 indicates the start of the half cycle.

At time t3, the resonant current Icr reaches zero, and the comparator 107 outputs the low signal Szero. In this event, the drive signal output circuit 110 finishes measuring the time period Tbl, and calculates a time period Tal until the end of the half cycle, based on the previously obtained feedback voltage Vfb and the time period Tbl.

At time t4, at which the time period Tal has elapsed since time t3, the drive signal output circuit 110 outputs the low drive signal lo, as illustrated in FIG. 6. From then, the same operations are repeated.

As has been described above, the drive signal output circuit 110 calculates the end time of the half cycle, for example, based on the time period Tbh measured from the time point at which the low drive signal lo is outputted and the feedback voltage Vfb at the time when the low drive signal lo is outputted. That is, the drive signal output circuit 110 controls, for example, the ratio between the time period Tbh and the time period Tah (i.e., the phase ratio) by the feedback voltage Vfb. By controlling in this manner using the feedback voltage Vfb and the time period Tbh changing depending on the state of the load 11, the drive signal output circuit 110 can maintain the output voltage Vout at the target level while following the changes in the state of the load 11.

Note that the drive signals ho, lo outputted by the drive signal output circuit 110 in accordance with the phase ratio control correspond to a "first drive signal".

===Output System of Drive Signals ho, lo in "Burst Mode"===

Figure 7:
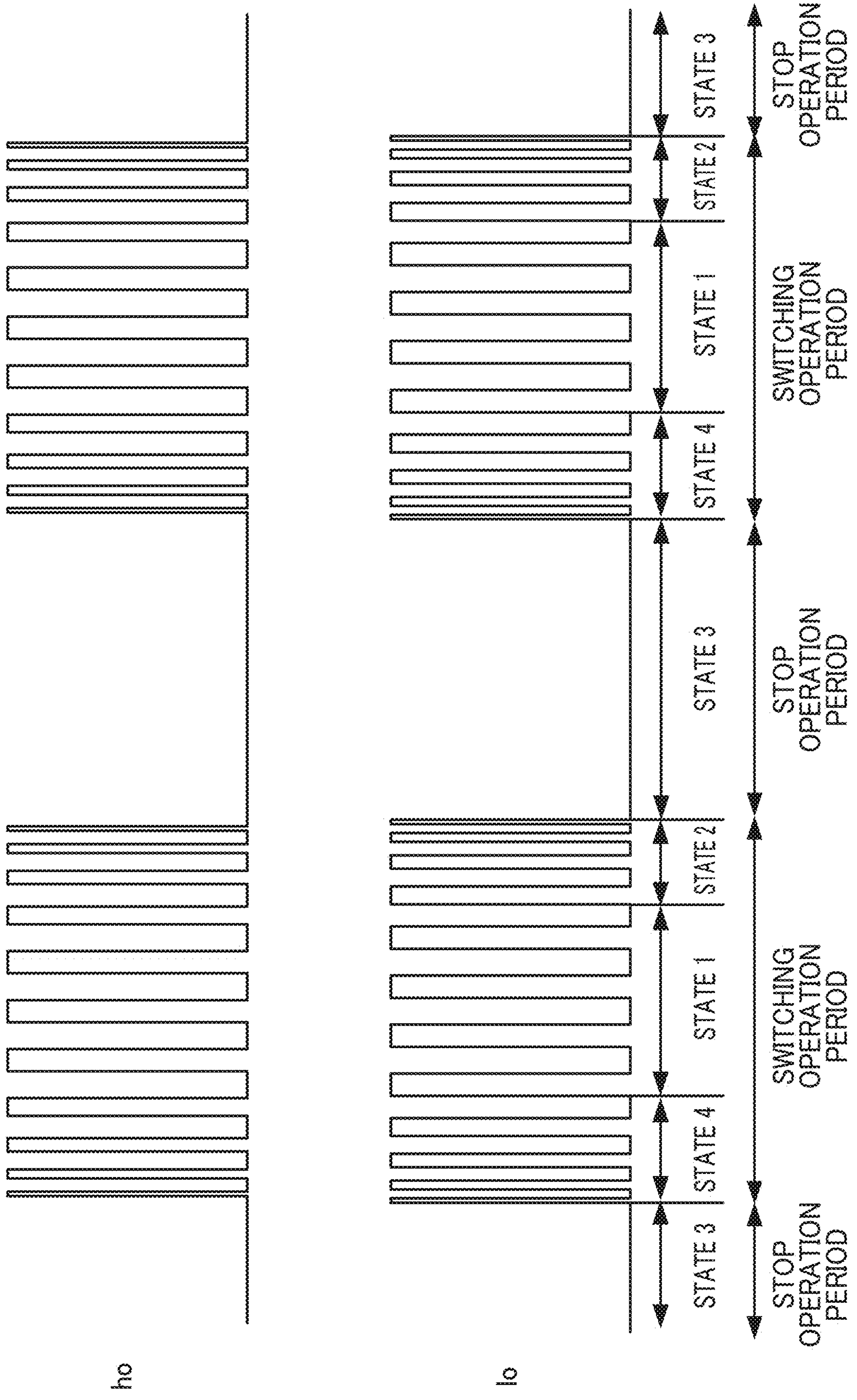
FIG. 7 is a diagram illustrating a drive pattern in a "burst mode".

FIG. 7 is a diagram illustrating a drive pattern in the "burst mode". When the switching power supply circuit 10 is operated in the "burst mode", the drive signal output circuit 110 outputs the drive signals ho, lo to drive the NMOS transistors 24*a* and 25 intermittently (i.e., during the switching operation period) with a stop operation period being provided, as illustrated in FIG. 7. Further, the state of the drive signal output circuit 110 transitions in the order of the "state 4", the "state 1", and the "state 2" during the switching operation period, and is in the "state 3" during the stop operation period, during which the driving of the NMOS transistors 24, 25 is stopped. Note that the drive signals ho, lo outputted by the drive signal output circuit 110 in the "state 3" correspond to a "fourth drive signal".

===Drive System in "State 4" in "Burst Mode"===

Figure 8:
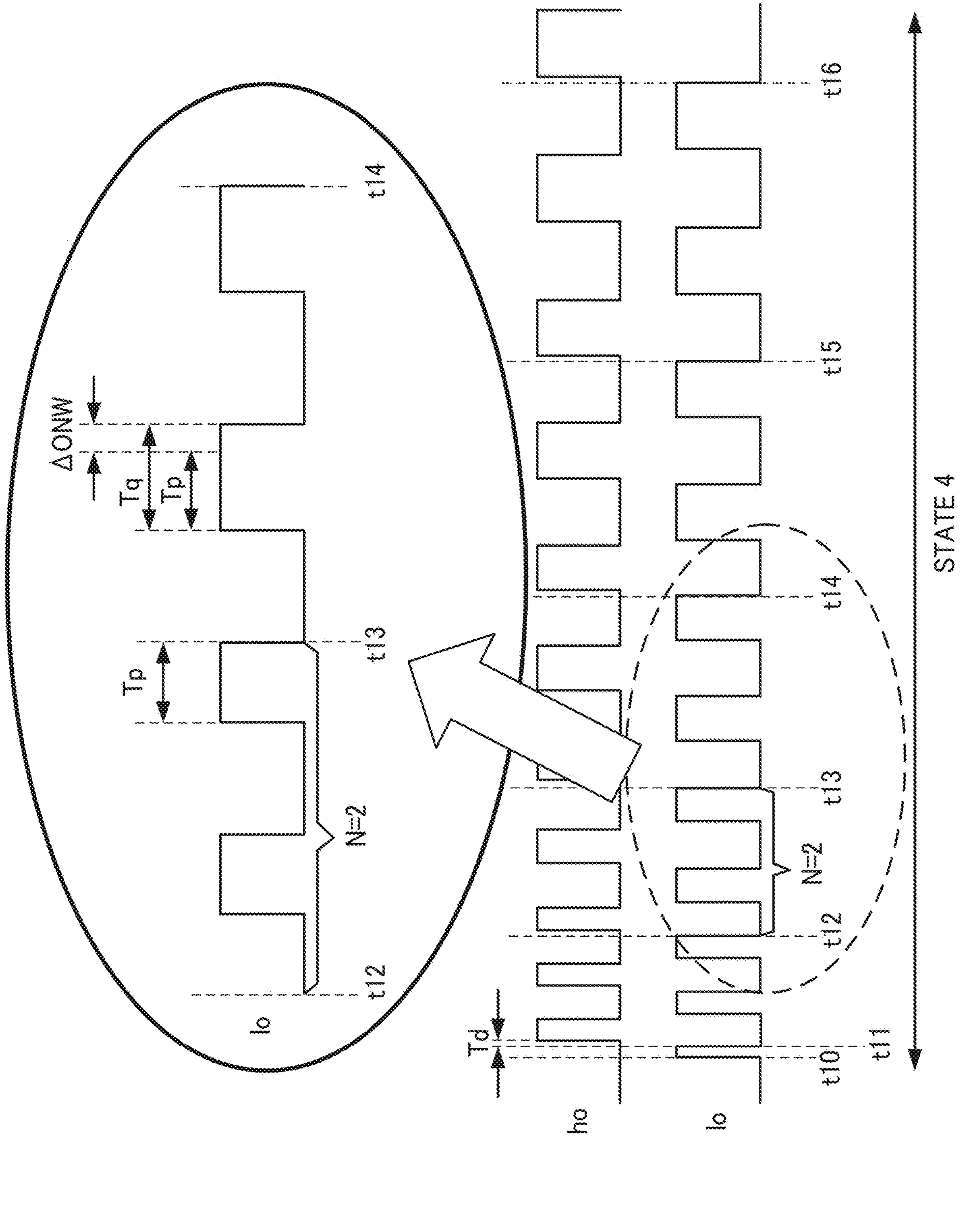
FIG. 8 is a diagram illustrating a drive system in a "state 4".

FIG. 8 is a diagram illustrating the drive system in the "state 4". When the switching power supply circuit 10 is operated in the "burst mode", the drive signal output circuit 110 outputs the drive signals ho and lo by the drive system that is so-called soft start, in response to the drive signal output circuit 110 entering the "state 4". Note that the "soft start" refers to an operation of outputting the drive signals ho and lo with the ON periods that gradually increase according to the amount of change ΔONW every predetermined number of times N (e.g., N=2) as illustrated in an enlarged view in FIG. 8. The following describes the soft start operation with reference to FIG. 8.

At time t10, the drive signal output circuit 110 enters the "state 4". Then, the drive signal output circuit 110 outputs the high drive signal lo.

At time t11, at which the predetermined ON period has elapsed since time t10, the drive signal output circuit 110 outputs the low drive signal lo. After time t11, the drive signal output circuit 110 outputs the drive signal lo with the ON period that gradually increases according to the amount of change ΔONW every predetermined number of times N. Further, the drive signal output circuit 110 outputs the drive signal ho and the drive signal lo alternately, the drive signal ho having the ON period equal to that of the drive signal lo.

From time t12, at which the drive signal output circuit 110 outputs the drive signal lo the predetermined number of times N from time t11, the drive signal output circuit 110 outputs the drive signal lo with the ON period increased by the amount of change ΔONW every predetermined number of times N.

Figure 9:
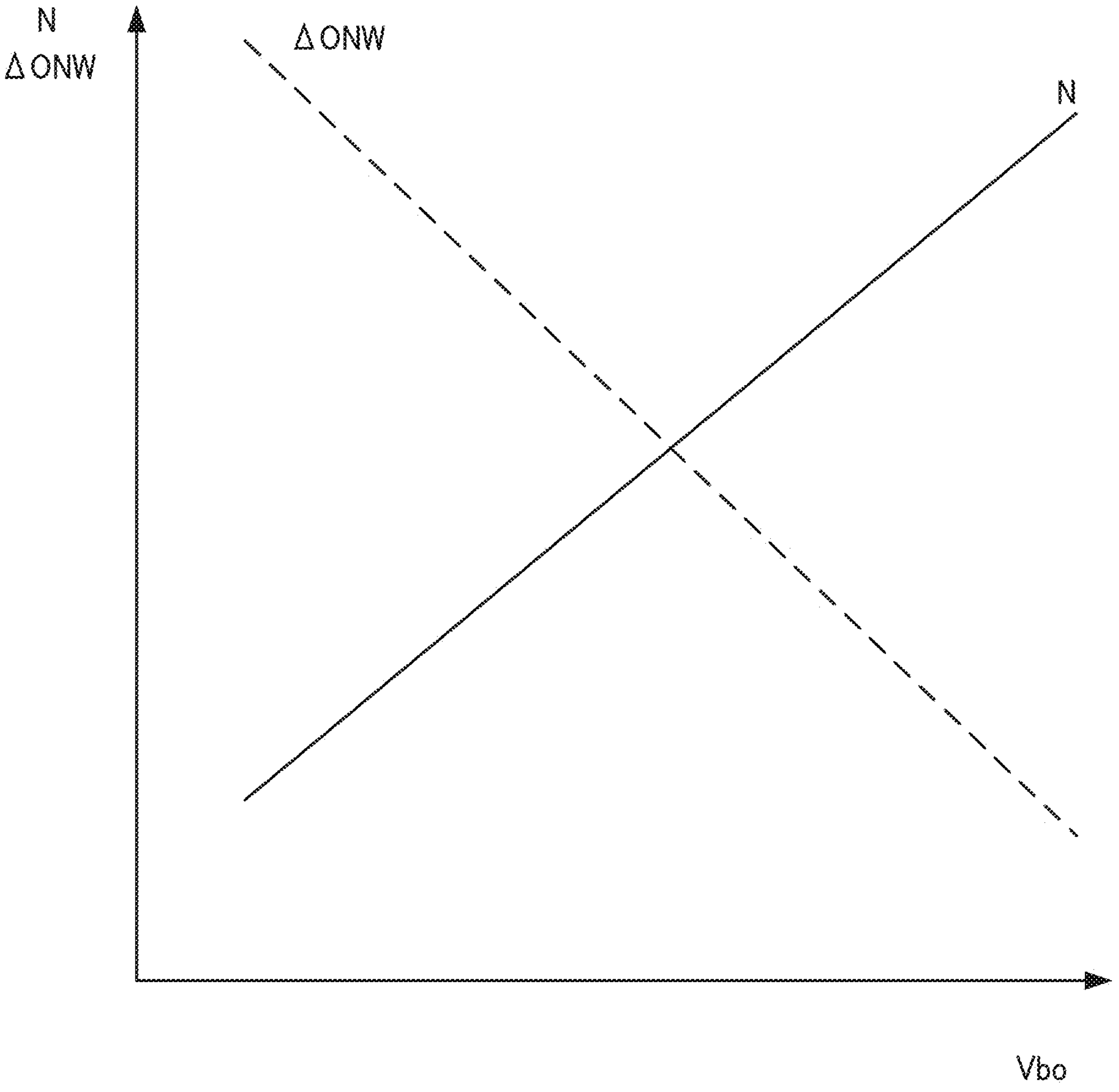
FIG. 9 is a diagram illustrating the relationship between a voltage Vbo, and the predetermined number of times N and the amount of change ΔONW.

The same or similar operations are repeated from time t12, thereby causing the drive signal output circuit 110 to output the drive signals ho and lo having the ON periods that gradually increase, in the soft start. Further, the predetermined number of times N is set so as to increase as the voltage Vbo rises, as given with the solid line in FIG. 9, and the amount of change ΔONW is set so as to decrease as the voltage Vbo rises, as given by the dashed line in FIG. 9. This causes the drive signal output circuit 110 to operate so as to increase the ON periods of the drive signals ho and lo little by little, as the voltage Vbo indicating the input voltage Vin rises, thereby reducing the effect of the input voltage Vin on the output voltage Vout. Note that the drive signals ho, lo outputted by the drive signal output circuit 110 in accordance with the soft start operation correspond to a "fifth drive signal".

===Drive System in "State 1" in "Burst Mode"===

Figure 10:
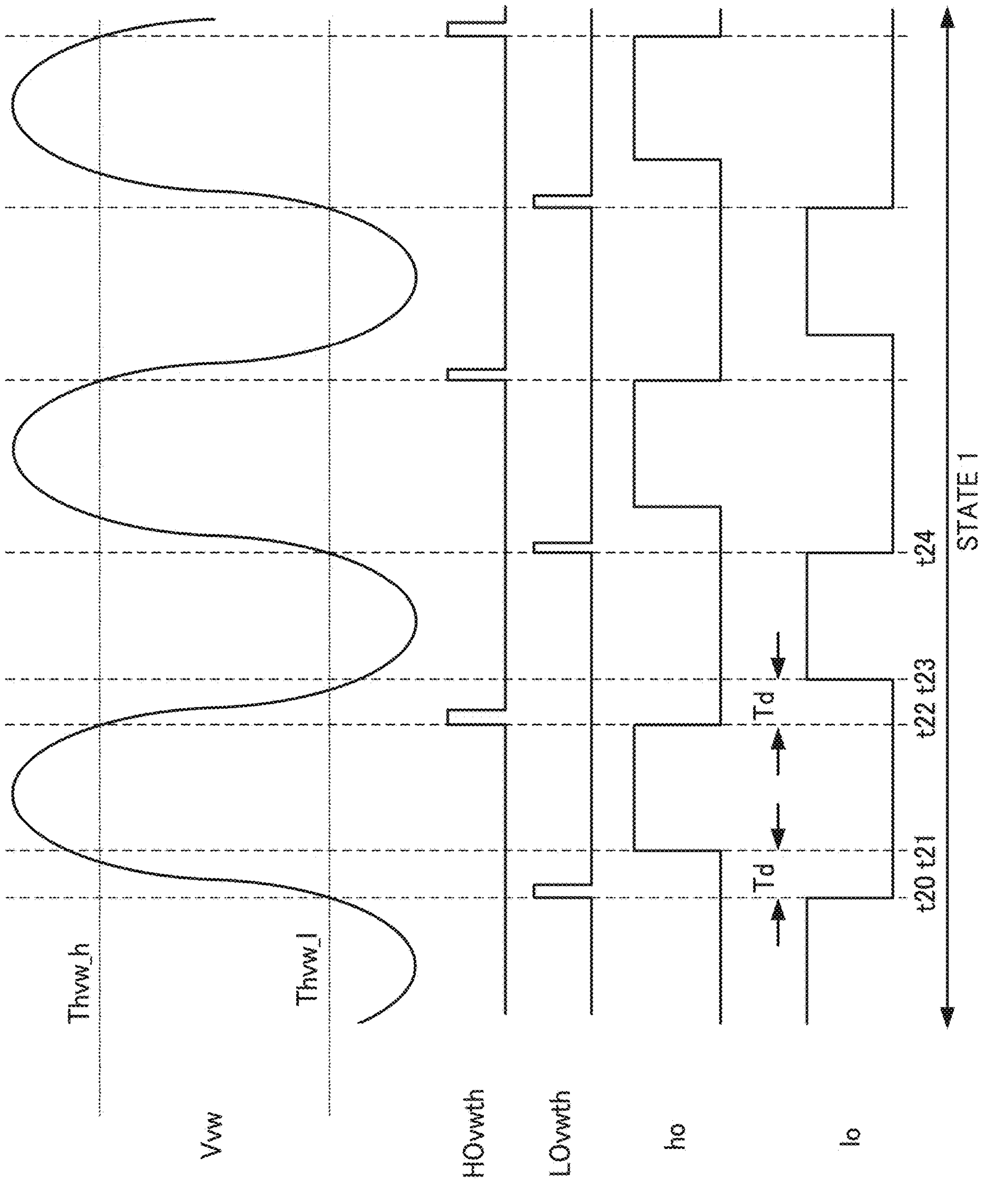
FIG. 10 is a diagram illustrating a drive system in a "state 1".

FIG. 10 is a diagram illustrating the drive system in the "state 1". When the switching power supply circuit 10 is operated in the "burst mode", the drive signal output circuit 110 outputs the drive signals ho, lo by a drive system that is so-called peak power control, in response to the drive signal output circuit 110 entering the "state 1". Note that the "peak power control" refers to a drive system for controlling the switching of NMOS transistors 24, 25, based on a result of comparison between the voltage Vvw and the high/low threshold, and the dead time Td.

The following describes the specific drive system of peak power control with reference to FIG. 10. It is assumed that before time t20, the drive signal output circuit 110 outputs the low drive signal ho and the high drive signal lo.

At time t20, at which the voltage Vvw exceeds the threshold value Thvw_l, the comparator circuit 105 outputs a pulse signal LOvwth. As illustrated in FIG. 11, the drive signal output circuit 110 outputs the low drive signal lo, upon receipt of the pulse signal LOvwth.

At time t21, at which the dead time Td has elapsed since time t20, the drive signal output circuit 110 outputs the high drive signal ho, as illustrated in FIG. 11.

At time t22, at which the voltage Vvw drops below the threshold value Thvw_h, the comparator circuit 105 outputs the pulse signal HOvwth. As illustrated in FIG. 11, the drive signal output circuit 110 outputs the low drive signal ho, upon receipt of the pulse signal HOvwth.

At time t23, at which the dead time Td has elapsed since time t22, the drive signal output circuit 110 outputs the high drive signal lo, as illustrated in FIG. 11.

At time t24, at which the voltage Vvw exceeds the threshold value Thvw_l, the comparator circuit 105 outputs the pulse signal LOvwth. As illustrated in FIG. 11, the drive signal output circuit 110 outputs the low drive signal lo, upon receipt of the pulse signal LOvwth. From then, the same operations are repeated.

Figure 12:
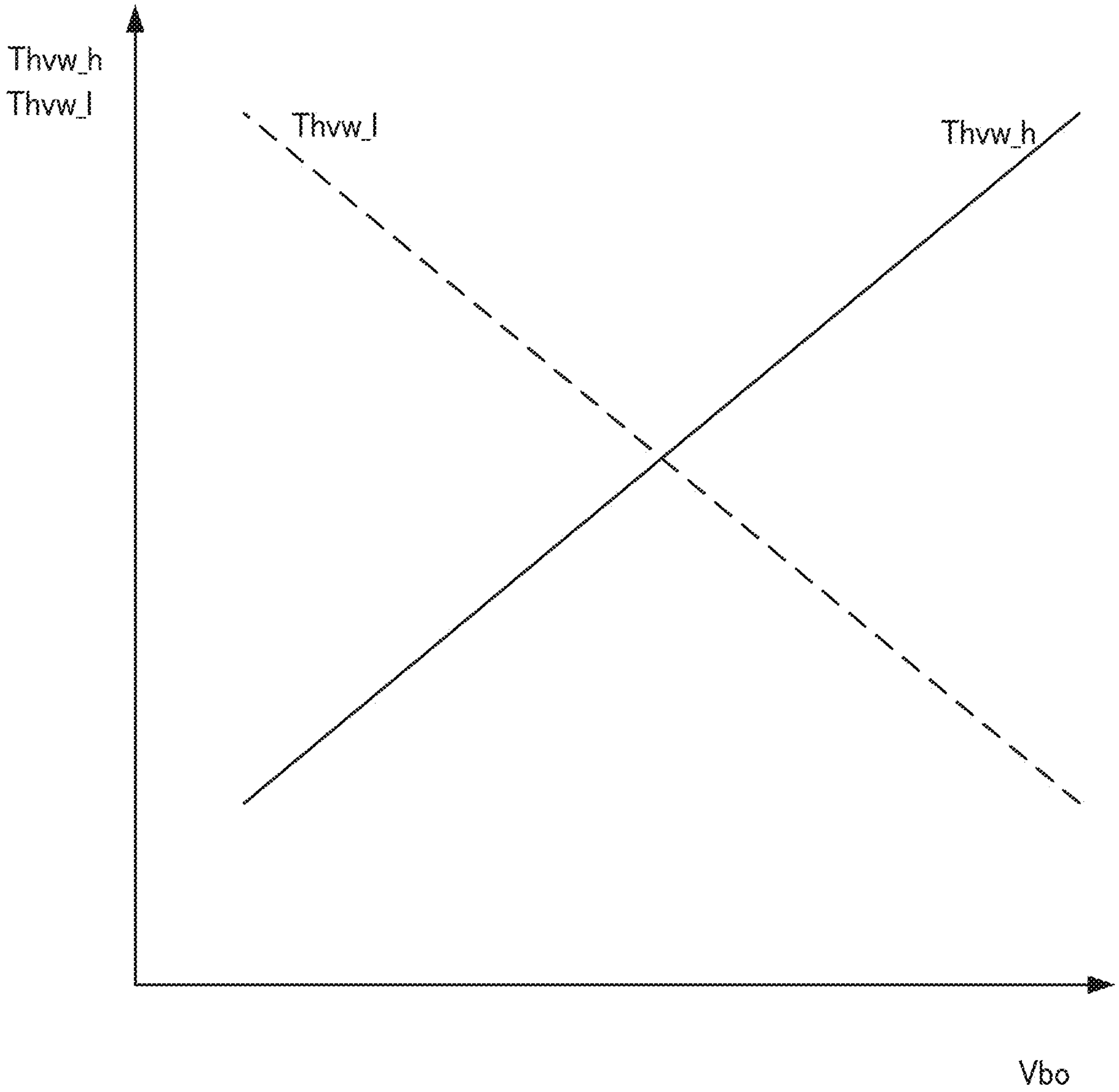
FIG. 12 is a diagram illustrating the relationship between a voltage Vbo and threshold values Thvw_h and Thvw_l.

Further, the threshold value Thvw_h is set to so as to increase as the voltage Vbo rises, as given by the solid line in FIG. 12. Meanwhile, the threshold value Thvw_l is set so as to decrease as the voltage Vbo rises, as given by the dashed line in FIG. 12. Thus, when the voltage Vbo rises, the drive signal output circuit 110 reduces the ON periods of the drive signals ho and lo, thereby reducing the effect of the input voltage Vin on the output voltage Vout. Note that the pulse signal HOvwth, LOvwth corresponds to a "predetermined condition". Further, the drive signals ho, lo, which is outputted by the drive signal output circuit 110 in accordance with the peak power control, correspond to a "second drive signal".

===Drive System in "State 2" during "Burst Mode"===

Figure 13:
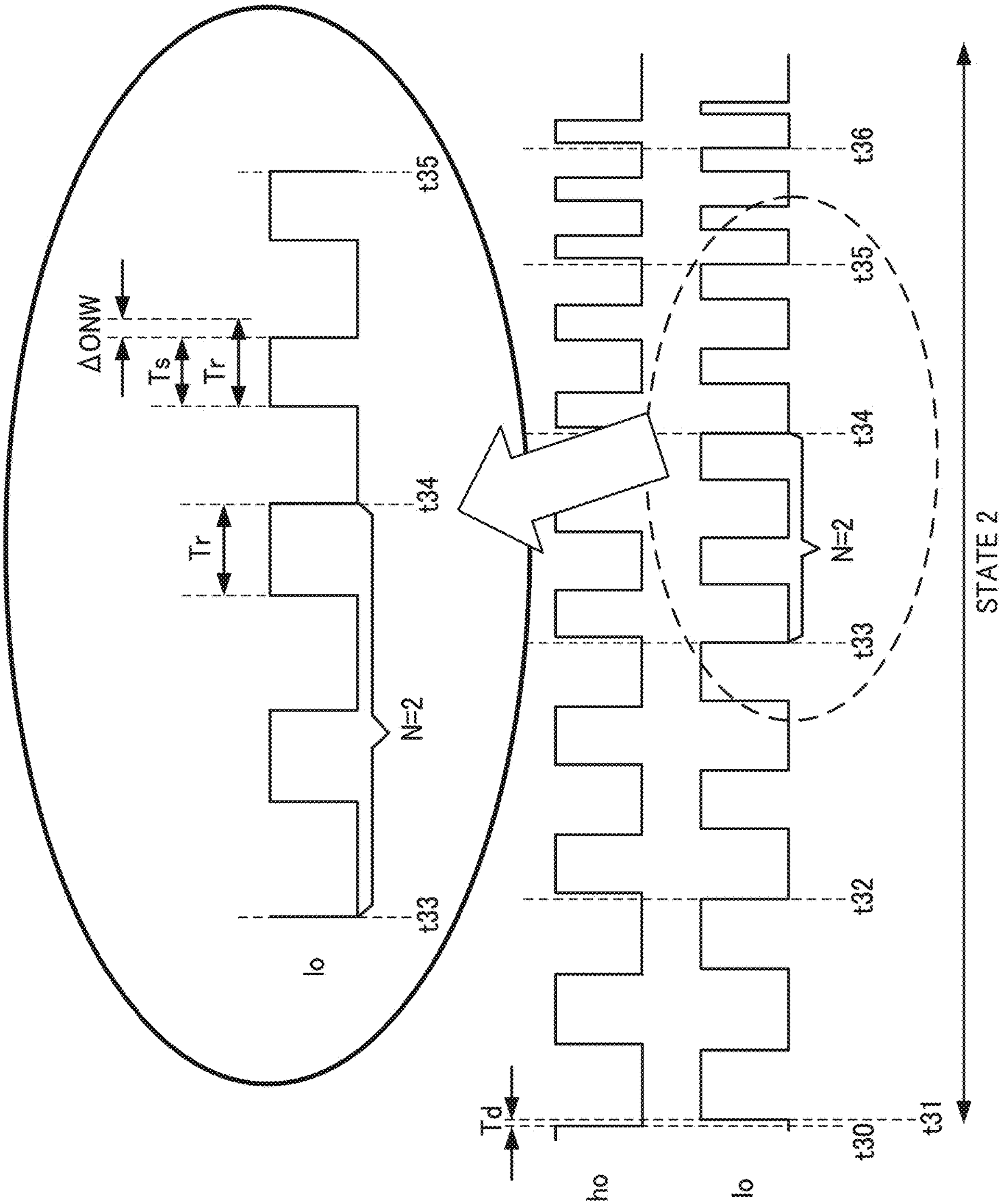
FIG. 13 is a diagram illustrating a drive system in a "state 2".

FIG. 13 is a diagram illustrating the drive system in the "state 2". When the switching power supply circuit 10 is operated in the "burst mode", the drive signal output circuit 110 outputs the drive signals ho, lo by a drive system that is so-called soft end, in response to the drive signal output circuit 110 entering the "state 2". Note that the "soft end" refers to an operation of outputting the drive signals ho and lo with the ON periods that gradually decrease according to the amount of change ΔONW every predetermined number of times N (e.g., N=2), as illustrated in an enlarged view in FIG. 13. The following describes the soft end operation with reference to FIG. 11.

At time t30, at which the drive signal output circuit 110 outputs the low drive signal ho, the drive signal output circuit 110 enters the "state 2".

At time t31, at which the dead time Td has elapsed since time t30, the drive signal output circuit 110 outputs the high drive signal lo. Thereafter, the drive signal output circuit 110 outputs the drive signal lo with the ON periods that gradually decrease according to the amount of change ΔONW every predetermined number of times N (e.g., twice). Further, the drive signal output circuit 110 outputs the drive signal ho and the drive signal lo, alternately, the drive signal ho having the ON period equal to that of the drive signal lo.

Thus, in the soft end, the drive signal output circuit 110 outputs the drive signals ho and lo whose ON periods gradually decrease. Further, as in the case of the soft start, the predetermined number of times N is set so as to increase as the voltage Vbo rises, as given by the solid line in FIG. 9, and the amount of change ΔONW is set so as to decrease as the voltage Vbo rises, as given by the dashed line in FIG. 9. This causes the drive signal output circuit 110 to operate so as to gradually reduce the ON periods of the drive signals ho and lo as the voltage Vbo indicating the input voltage Vin rises, thereby reducing the effect of the input voltage Vin on the output voltage Vout. Note that the drive signals ho, lo outputted by the drive signal output circuit 110 in accordance with the soft end operation correspond to a "third drive signal", and the state transition of the drive signal output circuit 110 in the "burst mode" corresponds to a "second pattern".

===Operation Immediately after Transition from "Normal Mode" to "Burst Mode"===

Figure 14:
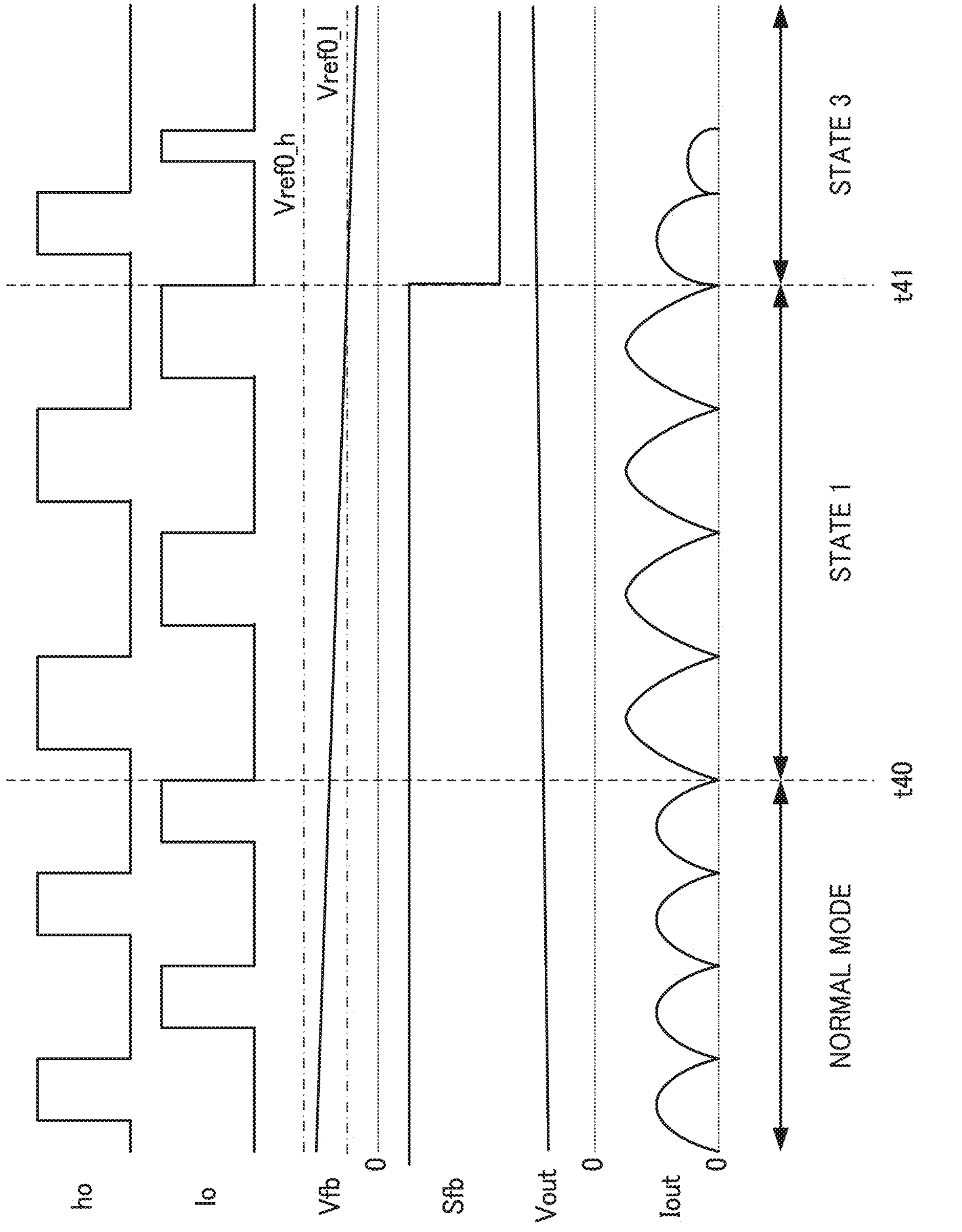
FIG. 14 is a diagram illustrating operation waveforms immediately after shifting from a "normal mode" to a "burst mode.

FIG. 14 is a diagram illustrating an operation waveform immediately after shifting from the "normal mode" to the "burst mode".

At time t40, at which the load 11 enters the light load state; the voltage Vca drops below the threshold value Vca_l; and the predetermined time period Ta has elapsed, the state of the drive signal output circuit 110 changes from the "normal mode" to the "state 1" in the "burst mode".

At time t41 at which the output voltage Vout rises and the feedback voltage Vfb drops below the reference voltage Vref0_*l*, the hysteresis comparator 101 outputs the low signal Sfb. The drive signal output circuit 110 that receives the low signal Sfb enters the "state 3". Thus, as a final process, the drive signal output circuit 110 outputs the drive signals ho and lo, having the predetermined ON periods, and then stops driving the NMOS transistors 24, 25. Note that the drive signals ho, lo outputted in the final process correspond to a "sixth drive signal".

Accordingly, the drive signal output circuit 110 stops driving the NMOS transistors 24, 25 after the output voltage Vout rises to some extent and the feedback voltage Vfb drops below the reference voltage Vref0_*l*. As a result, the drive signal output circuit 110 does not perform the soft end, thereby being able to restrain the output voltage Vout from reaching an overvoltage. Note that the state transition of the drive signal output circuit 110 immediately after shifting from the "normal mode" to the "burst mode" corresponds to a "first pattern".

===Drive Pattern in Switching Operation Period during "Burst Mode"===

Figure 15:
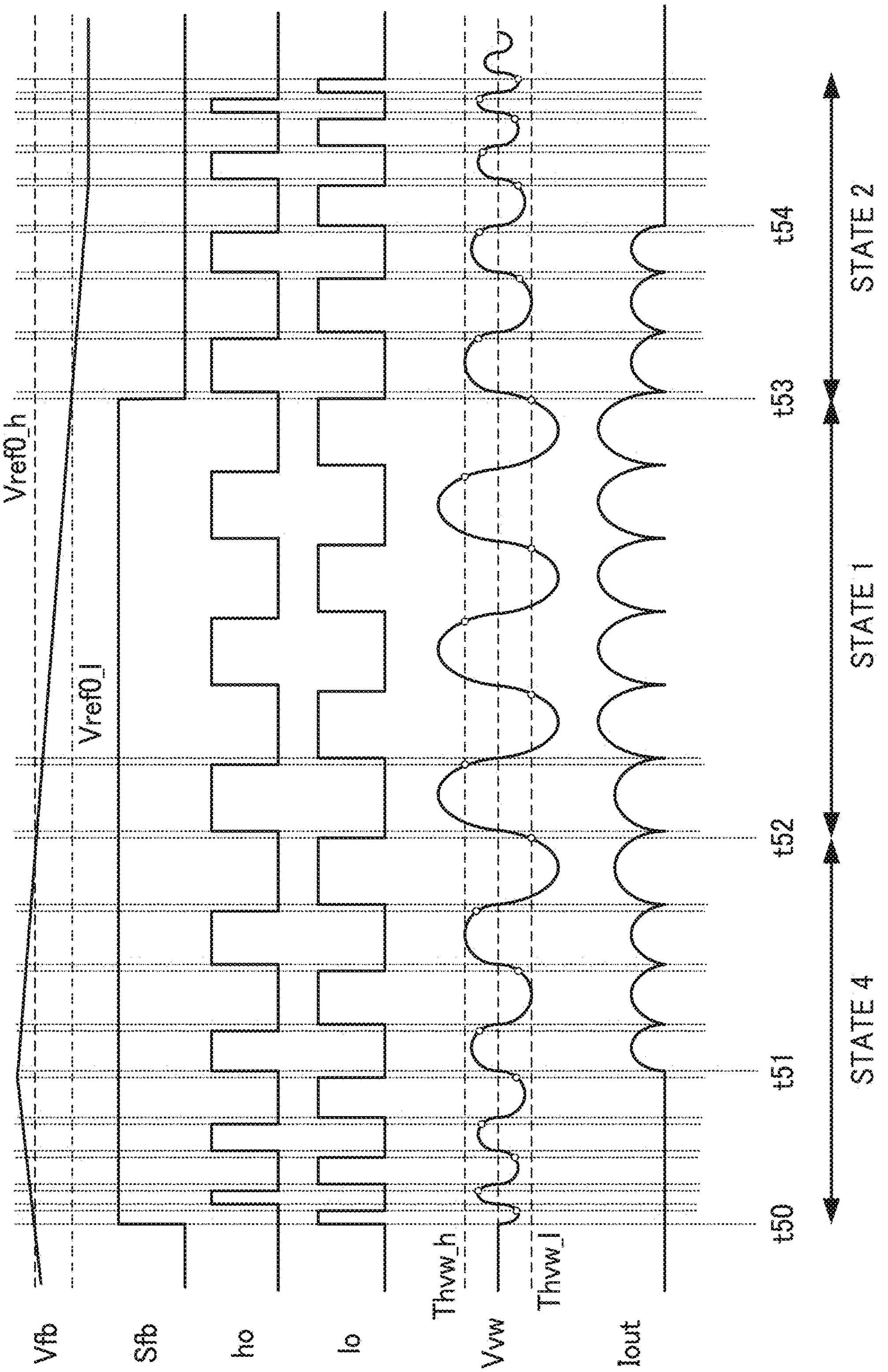
FIG. 15 is a diagram illustrating a driving pattern during a switching operation period in a "burst mode.

FIG. 15 is a diagram illustrating a drive pattern in the switching operation period in the "burst mode".

At time t50, at which the output voltage Vout drops, the feedback voltage Vfb exceeds the reference voltage Vref0_*h*, and the hysteresis comparator 101 outputs the high signal Sfb, the drive signal output circuit 110 enters the "state 4". Thus, the drive signal output circuit 110 starts the soft start, outputs the drive signal lo, and then outputs the drive signal ho. Furter, the drive signal output circuit 110 gradually increases the ON periods of the NMOS transistors 24, 25. However, a time period until time t51 is a switching ineffective period, and the output current Iout does not flow on the secondary side of the transformer 26.

At time t52, at which the soft start is completed, the drive signal output circuit 110 enters the "state 1". Thus, the drive signal output circuit 110 performs peak power control and outputs the drive signals ho and lo in accordance with the timing determined by the voltage Vvw.

At time t53, at which the output voltage Vout rises; the feedback voltage Vfb drops below the reference voltage Vref0_*l*; and the hysteresis comparator 101 outputs the low signal Sfb, the drive signal output circuit 110 enters the "state 2". Thus, the drive signal output circuit 110 starts the soft end and outputs the drive signals ho and lo having the ON periods that gradually decrease.

Further, as with the case of the soft start, when the ON periods of the drive signals ho and lo decreases, for example, a time period from time t54 is the switching ineffective period, and the output current Iout does not flow on the secondary side of the transformer 26.

Then, when the soft end is completed, the drive signal output circuit 110 enters the "state 3", and the drive signal output circuit 110 stops driving the NMOS transistors 24, 25.

Comparative Example

Figure 16:
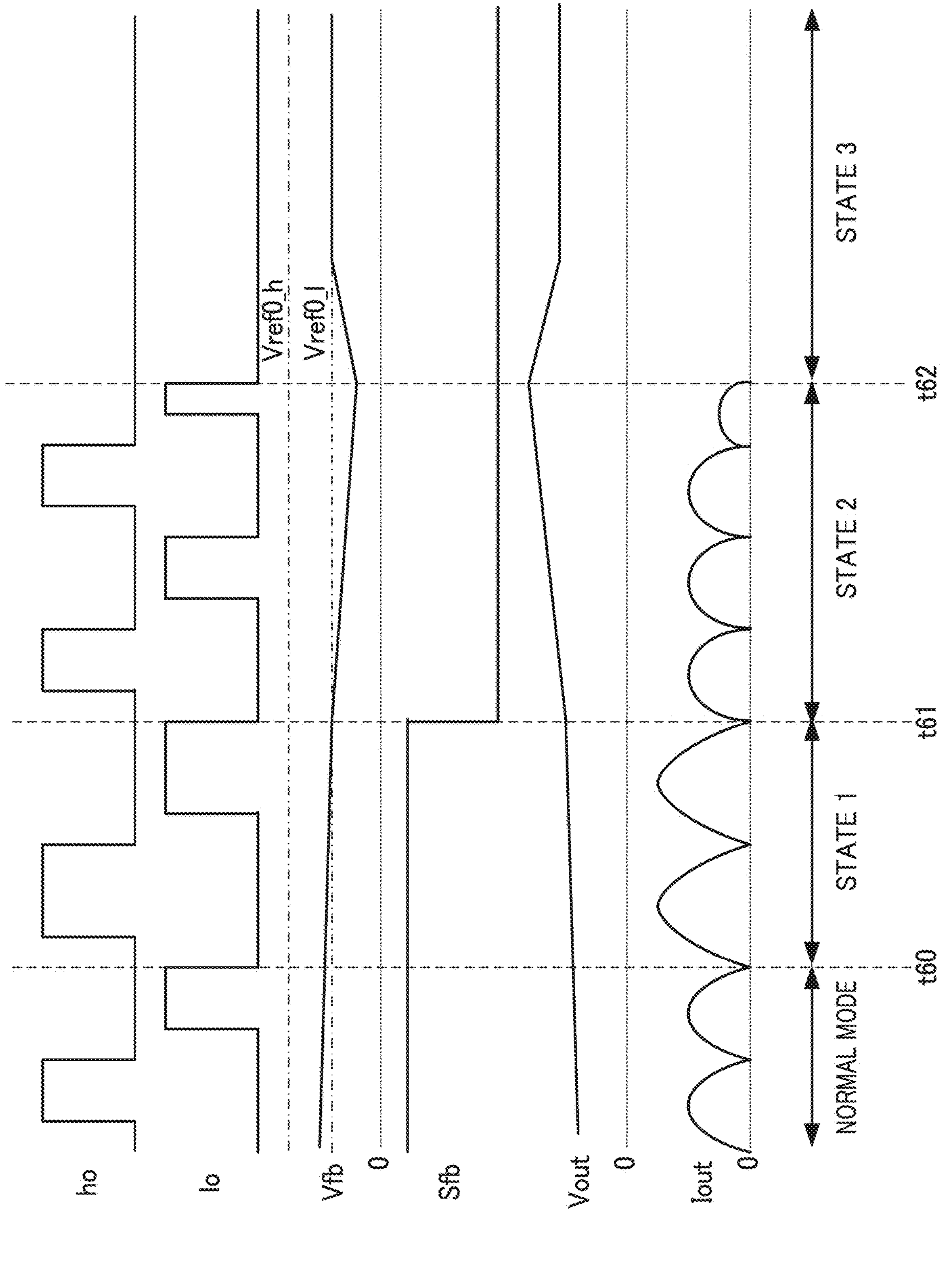
FIG. 16 is a diagram illustrating operation waveforms of a comparative example immediately after shifting from a "normal mode" to a "burst mode.

An embodiment of the present disclosure has been described above. FIG. 16 is a diagram illustrating an operation waveform of the comparative example immediately after shifting from the "normal mode" to the "burst mode". In the comparative example, when the switching power supply circuit 10 is operated by being shifted from the "normal mode" to the "burst mode", the drive signal output circuit 110 goes through the "state 1" and the "state 2", and then to the "state 3" in which the driving of the NMOS transistors 24, 25 is stopped. Note that time t60 and time t61 in FIG. 16 are the same as or similar to time t40 and time t41 in FIG. 14, and thus description thereof is omitted.

During the time period from time t61 to time t62 at which the soft end is finished, the drive signal output circuit 110 outputs the drive signals ho, lo having the ON periods that gradually decrease. In this case, since the load 11 is in the light load state, the switching power supply circuit 10 is operated in the "burst mode", but depending on the state of the load 11, the output voltage Vout may rise due to the soft end operation, which may cause an overvoltage. Note that from time t62, the drive signal output circuit 110 enters the "state 3", the drive signal output circuit 110 stops driving the NMOS transistors 24, 25, and thus the output voltage Vout gradually lowers and the feedback voltage Vfb gradually rises.

As such, unlike the case in an embodiment of the present disclosure, in the comparative example, the drive signal output circuit 110 goes through the "state 2" in which the soft end is performed, before entering the "state 3". Thus, the output voltage Vout may reach an overvoltage.

===Summary===

The switching supply circuit 10 according to an embodiment of the present disclosures has been described above. The control IC 40 includes the load detection circuit 109 and the drive signal output circuit 110. The drive signal output circuit 110 operates such that the drive signal output circuit 110 changes from the "state 1" to the "state 3" without going through the "state 2", immediately after the operation mode of the switching power supply circuit 10 shifts from the "normal mode" to the "burst mode". This makes it possible to provide a switching control circuit capable of restraining the output voltage from reaching an overvoltage when shifting from the "normal mode" to the "burst mode.

Further, when the switching power supply circuit 110 operates in the "burst mode", the drive signal output circuit 110 repeatedly transitions its state in the order of the "state 3," the "state 4", the "state 1", the "state 2", and the "state 3". This can suppress noise in the transformer 26 when driving the NMOS transistors 24, 25 intermittently.

The control IC 40 further includes the comparator 107 and the comparator circuit 105. This enables the control IC 40 to drive the NMOS transistors 24, 25 by performing phase ratio control, when the switching power supply circuit 10 operates in the "normal mode". Meanwhile, when the drive signal output circuit 110 is in the "state 1", the control IC 40 can drive the NMOS transistors 24, 25 by performing peak power control.

Further, the drive signal output circuit 110 reduces the amount of change ΔONW in the ON period of the drive signals ho, lo, in response to the input voltage Vin rising (i.e., the voltage Vbo rising), in the "state 2". This makes it possible to reduce the effect of the input voltage Vin on the output voltage Vout.

Further, the drive signal output circuit 110 reduces the amount of change ΔONW in the ON period of the drive signals ho, lo, in response to the input voltage Vin rising (i.e., the voltage Vbo rising), in the "state 4". This makes it possible to reduce the effect of the input voltage Vin on the output voltage Vout.

The control IC 40 further includes the load detection circuit 109 and the drive signal output circuit 110. The drive signal output circuit 110 repeatedly transitions the state of the drive signal output circuit 110 in the order of the "state 3", the "state 4", the "state 1", the "state 2", and the "state 3", when the switching power supply circuit 10 operates in "the burst mode". Then, the drive signal output circuit 110 reduces the amount of change ΔONW in the ON period of the drive signals ho, lo, in response to the input voltage Vin rising (i.e., the voltage Vbo rising), in each of the "state 2" and the "state 4". This makes it possible to reduce the effect of the input voltage Vin on the output voltage Vout.

The control IC 40 includes the drive signal output circuit 110. The drive signal output circuit 110 is configured to output the drive signals ho, lo so as to operate in a pattern in which the drive signal output circuit 110 transitions from the "state 1" to the "state 3" without going through the "state 2", and thereafter output the drive signals ho, lo so as to operate in a pattern in which the drive signal output circuit 110 transitions from the "state 1" to the "state 3" through the "state 2". This makes it possible to provide a switching control circuit capable of restraining the output voltage from reaching an overvoltage when shifting from the "normal mode" to the "burst mode.

Further, the control IC 40 further includes the load detection circuit 109. After the state of the load 11 changes from the heavy load state to the light load state, the drive signal output circuit 110 outputs the drive signals ho, lo in accordance with the transition from the "state 1" to the "state 3" without going through the "state 2". This makes it possible to restrain the output voltage from reaching an overvoltage according to the state of the load 11.

Further, when the load 11 is in the heavy load state, the drive signal output circuit 110 drives the NMOS transistors 24, 25 in the "normal mode", and when the load 11 is in the light load state, the drive signal output circuit 110 repeatedly transitions in the order from the "state 1", the "state 2", the "state 3", and the "state 4", and outputs the drive signals ho, lo. This enables the control IC 40 to output appropriate drive signals ho, lo according to the state of the load 11.

Further, when transitioning from the "state 1" to the "state 3", the drive signal output circuit 110 outputs the drive signals ho, lo having predetermined ON period, and thereafter outputs the drive signals ho, lo to stop the driving of the NMOS transistors 24, 25. This reduces the effect on the output voltage Vout when outputting the drive signals ho, lo to stop driving the NMOS transistors 24, 25.

According to the present disclosure, it is possible to provide the switching control circuit capable of restraining the output voltage from reaching an overvoltage when transitioning from the "normal mode" to the "burst mode".

An embodiment of the present disclosure described above is simply to facilitate understanding of the present disclosure and is not in any way to be construed as limiting the present disclosure. The present disclosure may variously be changed or altered without departing from its essential features and encompass equivalents thereof.

What is claimed is:

1. A switching control circuit for a power supply circuit that generates an output voltage of a target level from an input voltage thereof, the power supply circuit including
- a transformer including a primary coil, a secondary coil, and an auxiliary coil,
- a first transistor and a second transistor configured to control a current of the primary coil, and
- a first capacitor that forms a resonant circuit with the primary coil, the switching control circuit being configured to control switching of the first transistor and the second transistor, the switching control circuit comprising:
- a load detection circuit configured to detect a state of a load of the power supply circuit, based on a resonant current flowing through the resonant circuit; and
- a drive signal output circuit configured to output a drive signal, which
  - causes the power supply circuit to operate in a burst mode when the load is in a light-load state, and
  - causes the power supply circuit to operate in a normal mode when the load is in a heavy-load state, wherein
- the drive signal output circuit is configured to operate in:
  - a first state, in which the drive signal is outputted based on a predetermined condition,
  - a second state, in which the drive signal is outputted to gradually reduce an ON period of the first transistor and the second transistor, and
  - a third state, in which an output of the drive signal is stopped; and
- the drive signal output circuit is further configured to enter the third state from the first state without going through the second state, immediately after the power supply circuit starts operating in the burst mode.

2. The switching control circuit according to claim 1, wherein
- the drive signal output circuit is further configured to operate in a fourth state, in which the drive signal is outputted to gradually increase the ON period of the first transistor and the second transistor, and
- the drive signal output circuit is further configured to repeat a sequence of operating in the third state, in the fourth state, in the first state, and in the second state, immediately after the power supply circuit starts operating in the burst mode.

3. The switching control circuit according to claim 2, further comprising:

a detection circuit configured to detect a polarity of the resonant current; and a comparator circuit configured to compare a magnitude between each of a plurality of threshold values determined based on the input voltage and a voltage corresponding to a voltage at the auxiliary coil, wherein the drive signal output circuit is further configured to output the drive signal based on a result of detection of the detection circuit and a feedback voltage corresponding to the output voltage, when the power supply circuit is operating in the normal mode, and output the drive signal based on the predetermined condition that is determined based on a result of comparison of the comparator circuit, when the power supply circuit is operating in the first state in the burst mode.

4. The switching control circuit according to claim 3, wherein the drive signal output circuit is further configured to, in the second state, reduce an amount of change in the ON period of the first transistor and the second transistor, in response to the input voltage rising.

5. The switching control circuit according to claim 4, wherein the drive signal output circuit is further configured to, in the fourth state, reduce an amount of change in the ON period of the first transistor and the second transistor, in response to the input voltage rising.

6. A switching control circuit for a power supply circuit that generates an output voltage of a target level from an input voltage thereof, the power supply circuit including a transformer including a primary coil, a secondary coil, and an auxiliary coil, a first transistor and a second transistor configured to control a current flowing through the primary coil, and a first capacitor that forms a resonant circuit with the primary coil, the switching control circuit being configured to control switching of the first transistor and the second transistor, the switching control circuit comprising:

a load detection circuit configured to detect a state of a load of the power supply circuit, based on a resonant current flowing through the resonant circuit; and a drive signal output circuit configured to output a drive signal, which causes the power supply circuit to operate in a burst mode when the load is in a light-load state, and causes the power supply circuit to operate in a normal mode when the load is in a heavy-load state, wherein the drive signal output circuit is configured to operate in:

a first state, in which the drive signal is outputted based on a predetermined condition, a second state, in which the drive signal is outputted to gradually reduce an ON period of the first transistor and the second transistor, a third state, in which an output of the drive signal is stopped, and a fourth state, in which the drive signal is outputted to gradually increase the ON period of the first transistor and the second transistor, and the drive signal output circuit is further configured to repeat an operation of entering the first state, the second state, the third state, and the fourth state, and reduce an amount of change in the ON period of the first transistor and the second transistor, in response to the input voltage rising, in each of the second state and the fourth state.

7. A power supply circuit configured to generate an output voltage of a target level from an input voltage thereof, the power supply circuit comprising:

a transformer including a primary coil, a secondary coil, and an auxiliary coil;

a first transistor and a second transistor configured to control a current flowing through the primary coil;

a first capacitor that forms a resonant circuit with the primary coil; and a switching control circuit configured to control switching of the first transistor and the second transistor, the switching control circuit including:

a load detection circuit configured to detect a state of a load of the power supply circuit, based on a resonant current flowing through the resonant circuit; and a drive signal output circuit configured to output a drive signal, which causes the power supply circuit to operate in a burst mode when the load is in a light-load state, and causes the power supply circuit to operate in a normal mode when the load is in a heavy-load state, wherein the drive signal output circuit is configured to operate in:

a first state, in which the drive signal is outputted based on a predetermined condition, a second state, in which the drive signal is outputted to gradually reduce an ON period of the first transistor and the second transistor, and a third state, in which an output of the drive signal is stopped; and the drive signal output circuit is further configured to enter the third state from the first state, without going through the second state, immediately after the power supply circuit starts operating in the burst mode.

8. A switching control circuit for a power supply circuit that generates an output voltage of a target level from an input voltage thereof, the power supply circuit including a transformer including a primary coil, a secondary coil, and an auxiliary coil, a first transistor and a second transistor configured to control a current flowing through the primary coil, and a first capacitor that forms a resonant circuit with the primary coil, the switching control circuit being configured to control switching of the first transistor and the second transistor, the switching control circuit comprising:

a drive signal output circuit configured to output a plurality of types of drive signals to drive the first transistor and the second transistor, the plurality of types of drive signals including:

a first drive signal outputted based on a resonant current of the resonant circuit and a feedback voltage corresponding to the output voltage, a second drive signal outputted based on a dead time and a timing at which a voltage at the auxiliary coil reaches any of a plurality of predetermined levels, a third drive signal outputted so as to gradually reduce an ON period of the first transistor and the second transistor, and a fourth signal outputted so as to stop driving of the first transistor and the second transistor, wherein the drive signal output circuit is configured to operate in a first pattern of outputting the first drive signal, then the second drive signal, and then the fourth drive signal, without outputting the third drive signal, and thereafter operate in a second pattern of outputting in an order of the second drive signal, the third drive signal, and the fourth drive signal.

9. The switching control circuit according to claim 8, further comprising:

a load detection circuit configured to detect a state of a load of the power supply circuit, based on the resonant current of the resonant circuit, wherein the drive signal output circuit operates in the first pattern, after the state of the load changes from a heavy-load state to a light-load state.

10. The switching control circuit according to claim 9, wherein the plurality of drive signals further includes a fifth drive signal outputted so as to gradually increase the ON period of the first transistor and the second transistor, and the drive signal output circuit is further configured to output the first drive signal when the load is in the heavy-load state, and repeatedly outputting the second drive signal, the third signal, the fourth signal and the fifth signal in this order, as the second pattern, when the load is in the light-load state.

11. The switching control circuit according to claim 10, wherein the plurality of types of drive signals further includes a sixth drive signal having a predetermined ON period, and the drive signal output circuit is further configured to output the first drive signal, then the second drive signal, then the sixth drive signal, without outputting the third drive signal, and then the fourth drive signal, as the first pattern.

* * * * *